United States Patent
Jang et al.

(10) Patent No.: US 12,219,587 B2
(45) Date of Patent: Feb. 4, 2025

(54) APPARATUS AND METHOD FOR INTER-CELL INTERFERENCE CONTROL FOR WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Suha Yoon, Gyeonggi-do (KR); Younsun Kim, Gyeonggi-do (KR); Jinhyun Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 224 days.

(21) Appl. No.: 17/544,064

(22) Filed: Dec. 7, 2021

(65) Prior Publication Data

US 2022/0183015 A1    Jun. 9, 2022

(30) Foreign Application Priority Data

Dec. 7, 2020  (KR) .................. 10-2020-0169857
Dec. 23, 2020  (KR) .................. 10-2020-0182446

(51) Int. Cl.
*H04W 4/00*    (2018.01)
*H04L 5/00*    (2006.01)
*H04W 72/541*    (2023.01)

(52) U.S. Cl.
CPC ......... *H04W 72/541* (2023.01); *H04L 5/0007* (2013.01); *H04L 5/0048* (2013.01); *H04L 5/0073* (2013.01)

(58) Field of Classification Search
CPC .. H04W 72/541; H04L 5/0007; H04L 5/0048; H04L 5/0073; H04L 5/0044; H04L 5/0094
See application file for complete search history.

(56) References Cited

U.S. PATENT DOCUMENTS 9,276,709 B2   3/2016 Mazzarese et al.
9,924,504 B2   3/2018 Barbieri et al.
(Continued)

FOREIGN PATENT DOCUMENTS

EP   3119151 A1 *  1/2017  ............ H04J 11/005
EP   2904844 B1 *  4/2018  ............ H04J 11/0036
(Continued)

OTHER PUBLICATIONS

J. Xie, C. Xiaogang, Y. Zhu, H. Yang and L. Dai, "A Novel Method to Solve CRS/PDSCH RE Collision in Joint Transmission in LTE-A," 2012 International Conference on Connected Vehicles and Expo (ICCVE), Beijing, China, 2012, pp. 66-70, doi: 10.1109/ICCVE.2012.20. (Year: 2012).*

(Continued)

*Primary Examiner* — Thai Dinh Hoang
(74) *Attorney, Agent, or Firm* — The Farrell Law Firm, P.C.

(57) ABSTRACT

The disclosure relates to a communication technique that converges a 5G communication system for supporting a higher data rate after a 4G system with IoT technology, and a system thereof. The disclosure may be applied to intelligent services (e.g., smart homes, smart buildings, smart cities, smart or connected cars, healthcare, digital education, retail, security and safety related services, etc.) based on 5G communication technology and IoT-related technology. In addition, the disclosure relates to a method and apparatus for performing communication in a wireless communication system composed of multiple cells.

14 Claims, 16 Drawing Sheets

(56) References Cited

U.S. PATENT DOCUMENTS

| | | | |
|---|---|---|---|
| 10,178,679 B2 | 1/2019 | Yang et al. | |
| 2014/0044061 A1 | 2/2014 | Yue et al. | |
| 2014/0146689 A1* | 5/2014 | Gaur | H04L 5/0035 |
| | | | 370/252 |
| 2014/0177541 A1 | 6/2014 | Li et al. | |
| 2015/0103683 A1* | 4/2015 | Kim | H04J 11/0059 |
| | | | 370/252 |
| 2015/0146644 A1* | 5/2015 | Kim | H04L 5/0023 |
| | | | 370/329 |
| 2015/0195068 A1* | 7/2015 | Kim | H04L 5/0048 |
| | | | 370/329 |
| 2015/0207601 A1 | 7/2015 | Kim et al. | |
| 2015/0215103 A1* | 7/2015 | Tsai | H04W 72/27 |
| | | | 370/329 |
| 2016/0119936 A1* | 4/2016 | Kim | H04J 11/0053 |
| | | | 370/329 |
| 2016/0135194 A1* | 5/2016 | Kim | H04L 1/0003 |
| | | | 370/329 |
| 2017/0163367 A1* | 6/2017 | Tsai | H04B 15/00 |
| 2017/0188371 A1* | 6/2017 | Kim | H04L 1/0015 |
| 2017/0230985 A1* | 8/2017 | Yamada | H04W 72/23 |
| 2018/0027572 A1* | 1/2018 | Kim | H04L 5/0073 |
| | | | 370/329 |
| 2018/0192404 A1 | 7/2018 | Maaref et al. | |
| 2022/0183015 A1* | 6/2022 | Jang | H04L 5/0094 |
| 2022/0400391 A1* | 12/2022 | Ryu | H04L 5/0055 |

FOREIGN PATENT DOCUMENTS

| | | | | |
|---|---|---|---|---|
| KR | 1020160068836 | | 6/2016 | |
| KR | 10-2021-0061203 | | 5/2021 | |
| WO | WO-2014018756 A1 | * | 1/2014 | H04B 7/024 |
| WO | WO-2015005609 A1 | * | 1/2015 | H04B 7/022 |
| WO | WO-2016021494 A1 | * | 2/2016 | H04B 1/7103 |
| WO | WO-2017200119 A1 | * | 11/2017 | |

OTHER PUBLICATIONS

3GPP TS 38.214 V16.7.0, 2021.09, pp. 172.
International Search Report dated Mar. 10, 2022 issued in counterpart application No. PCT/KR2021/018422, 8 pages.
European Search Report dated Jan. 18, 2024 issued in counterpart application No. 21903796.7-1213, 7 pages.

* cited by examiner

APPARATUS AND METHOD FOR INTER-CELL INTERFERENCE CONTROL FOR WIRELESS COMMUNICATION SYSTEM

CROSS-REFERENCE TO RELATED APPLICATION(S)

This application is based on and claims priority under 35 U.S.C. § 119 to Korean Patent Application No. 10-2020-0169857, filed on Dec. 7, 2020, in the Korean Intellectual Property Office, and Korean Patent Application No. 10-2020-0182446, filed on Dec. 23, 2020, in the Korean Intellectual Property Office, the disclosures of which are incorporated by reference herein in their entireties.

BACKGROUND

1. Field

The disclosure relates generally to a method and an apparatus for performing communication in a wireless communication system including multiple cells.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "Beyond 4G Network" communication system or a "Post long term evolution (LTE)" system. The 5G communication system is considered to be implemented in higher frequency (millimeter wave (mmWave)) bands (e.g., 60 gigahertz (GHz) bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (CoMP), and reception-end interference cancellation. In the 5G system, hybrid frequency shift keying (FSK) and quadrature amplitude modulation (QAM) (FQAM), sliding window superposition coding (SWSC) as an advanced coding modulation (ACM), filter bank multi carrier (FBMC), non-orthogonal multiple access (NOMA), and sparse code multiple access (SCMA) as an advanced access technology have also been developed.

The Internet is now evolving to the Internet of things (IoT) where distributed entities, such as things, exchange and process information without human intervention. The Internet of everything (IoE), which is a combination of IoT technology and big data processing technology through connection with a cloud server, has emerged. As technology elements, such as a "sensing technology", a "wireless communication and network infrastructure", a "wired communication and network infrastructure", a "service interface technology", and a "security technology" have been demanded for IoT implementation, a sensor network, a machine-to-machine (M2M) communication, and a machine type communication (MTC), have been recently researched. Such an IoT environment may provide intelligent Internet technology services that create a new value to human life by collecting and analyzing data generated among connected things. IoT may be applied to a variety of fields including smart homes, smart buildings, smart cities, smart car or connected cars, smart grids, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud radio access network (RAN), as the above-described big data processing technology, may also be considered an example of convergence of the 5G technology with the IoT technology.

For coexistence between LTE and new radio (NR) (LTE-NR Coexistence), NR provides a function of configuring a pattern of a cell specific reference signal (CRS) of LTE to an NR user equipment (UE). In a single-transmission and reception point (TRP) configured UE, only one CRS pattern may be configured per one LTE carrier. Therefore, if a neighboring LTE cell(s) uses a CRS pattern different from that of the serving cell (LTE-NR coexistence cell) of the UE in a multi-cell environment, the UE may experience considerable interference from the neighboring LTE cell(s). In connection with the above-mentioned problem, interference with the UE may be reduced by appropriate scheduling of the base station, but there are limitations in that scheduling may be performed resource block (RB) by RB, and the CRS may be mapped resource element (RE) by RE.

SUMMARY

The present disclosure has been made to address the above-mentioned problems and disadvantages, and to provide at least the advantages described below.

In accordance with an aspect of the disclosure, a method performed by a terminal in a communication system is provided. The method includes receiving, from a base station, configuration information associated with a CRS pattern of a cell via higher layer signaling; identifying REs for a CRS based on the configuration information; determining whether a physical downlink shared channel (PDSCH) is received on the REs for the CRS; receiving, from the base station, the PDSCH based on the determination, wherein the PDSCH is received by performing interference cancellation in case that the PDSCH is received on the REs for the CRS.

In accordance with another aspect of the disclosure, a terminal in a communication system is provided. The terminal includes a transceiver; and a controller configured to receive, from a base station, configuration information associated with a CRS pattern of a cell via higher layer signaling; identify REs for a CRS based on the configuration information; determine whether a PDSCH is received on the REs for the CRS; receive, from the base station, the PDSCH based on the determination, wherein the PDSCH is received by performing interference cancellation in case that the PDSCH is received on the REs for the CRS.

In accordance with another aspect of the disclosure, a method performed by a base station in a communication system is provided. The method includes transmitting, to a terminal, configuration information associated with a CRS pattern of a cell via higher layer signaling; identifying REs for a CRS based on the configuration information; determining whether to transmit a PDSCH on the REs for the CRS; and transmitting, to the terminal, the PDSCH based on the determination.

In accordance with another aspect of the disclosure, a base station in a communication system in provided. The base station includes a transceiver; and a controller configured to transmit, to a terminal, configuration information associated with a CRS pattern of a cell via higher layer signaling; identify REs for a CRS based on the configuration information; determine whether to transmit a PDSCH on the REs for the CRS; and transmit, to the terminal, the PDSCH based on the determination.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
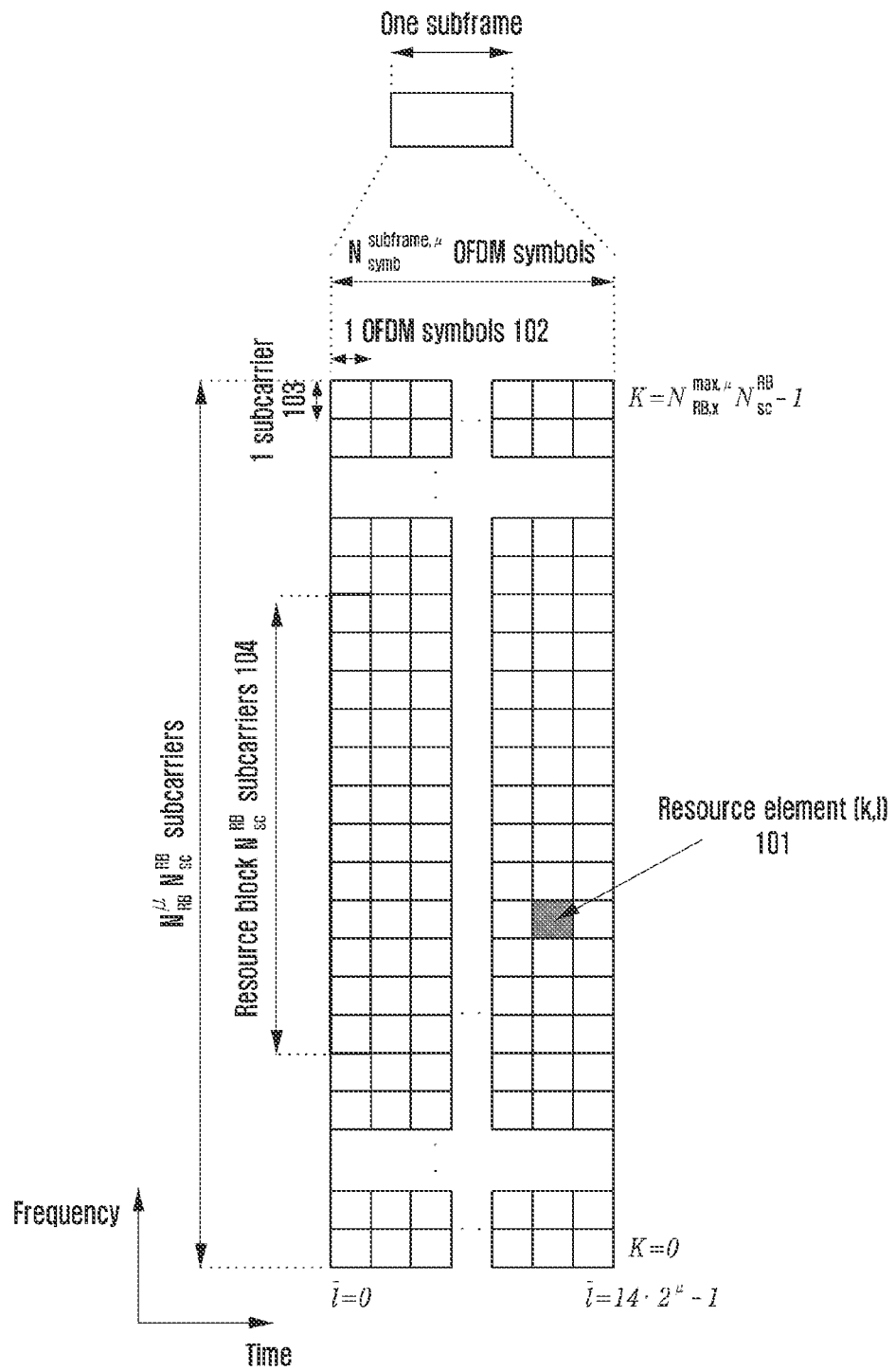
FIG. 1 is a diagram illustrating a basic structure of a time-frequency domain, which is a radio resource domain in which data or a control channel is transmitted in a 5G system, according to an embodiment.

Hereinafter, embodiments of the disclosure will be described in detail with reference to the accompanying drawings.

According to disclosed embodiments, services may be effectively provided in a wireless communication system in which NR and LTE network coexist.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a BS, a wireless access unit, a base station controller, and a node on a network. A terminal may include a UE, a mobile station (MS), a cellular phone, a smartphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, although the following description may be directed to an LTE or LTE-advanced (A) system by way of example, embodiments of the disclosure may also be applied to other communication systems having similar technical backgrounds or channel types to the embodiments of the disclosure. Examples of other communication systems may include 5G mobile communication technologies (5G NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, a "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements or divided into a larger number of elements. Moreover, the elements and "units" or may be implemented to reproduce one or more central processing units (CPUs) within a device or a security multimedia card. Further, the "unit" may include one or more processors.

A wireless communication system has evolved from providing an initial voice-oriented service to a broadband wireless communication system that provides high-speed and high-quality packet data services, such as high speed packet access (HSPA) in $3^{rd}$ generation partnership project (3GPP), LTE or evolved universal terrestrial radio access (E-UTRA), LTE-A, LTE-pro, high rate packet data (HRPD) in 3GPP2, ultra-mobile broadband (UMB), and communication standards such as the Institute of Electrical and Electronics Engineers (IEEE)'s 802.16e.

In the LTE system, which is a representative example of the broadband wireless communication system, in downlink, an orthogonal frequency division multiplexing (OFDM) scheme is adopted, and in uplink, a single carrier frequency division multiple access (SC-FDMA) scheme is adopted. Uplink refers to a radio link in which a UE (or an MS) transmits data or control signals to a base station (or eNode B), and downlink refers to a radio link in which a base station transmits data or control signals to the UE. The above-described multiple access method allows the data or control information of each user to be distinguished so as not to overlap each other, by allocating and operating the time-frequency resources to which the data or control information for each user are to be transmitted, thereby establishing orthogonality.

The 5G communication system, which is a communication system after LTE, must support services that simultaneously satisfy various requirements so that various requirements from users and service providers can be freely reflected. Services considered for the 5G communication system include enhanced mobile broadband (eMBB), massive machine type communication, (mMTC), and ultra reliability low latency communication (URLLC).

The eMBB aims to provide more improved data transfer rates than those supported by existing LTE, LTE-A or LTE-Pro. For example, in the 5G communication system, the eMBB should be able to provide a peak data rate of 20 gigabits per second (Gbps) in the downlink and a peak data rate of 10 Gbps in the uplink from the viewpoint of one base station. In addition, the 5G communication system must provide the peak data rate and the increased user perceived data rate of the UE at the same time. In order to satisfy such a requirement, improved various transmission/reception technologies including a more advanced multi-antenna (multi input multi output, (MIMO)) transmission technology are required. In addition, in the LTE system, a signal is transmitted using a transmission bandwidth of up to 20 megahertz (MHz) in the 2 gigahertz (GHz) band, whereas the 5G communication system can satisfy the data transmission rate required by the 5G communication system by using a frequency bandwidth wider than 20 MHz in a frequency band of 3 to 6 GHz or 6 GHz or more.

At the same time, mMTC is being considered to support application services such as the IoT in the 5G communication system. In order to efficiently provide the IoT, mMTC requires access support for large-scale UEs within a cell, improvement of coverage of UEs, improved battery life, and reduction of costs of UEs. Because the IoT is attached to various sensors and various devices to provide communication functions, the IoT must be able to support many UEs (e.g., 1,000,000 UEs/square kilometer ($km^2$)) within a cell. In addition, because a UE supporting mMTC is highly likely to be in a shaded area that a cell cannot cover, such as the basement of a building, due to the nature of the service, wider coverage compared to other services provided by the 5G communication system may be required. A UE supporting mMTC must be a low-cost UE, and because it is difficult to frequently exchange the battery of the UE, a very long battery lifetime, such as 10 to 15 years, may be required.

Lastly, URLLC is a cellular-based wireless communication service used for a specific purpose (mission-critical). For example, services used for remote control of a robot or machinery, industrial automation, an unmanned aerial vehicle, remote health care, or an emergency alert, may be considered. Therefore, the communication provided by URLLC must provide very low latency and very high reliability. For example, a service supporting URLLC must satisfy the air interface latency of less than 0.5 milliseconds (ms) and, at the same time, must satisfy the requirement of a packet error rate of $10^{-5}$ or less. Therefore, for a service supporting URLLC, the 5G communication system must provide a transmit time interval (TTI) that is smaller than that of other services, and at the same time must allocate a wide resource in a frequency band to secure the reliability of the communication link.

The three services of the 5G communication system, i.e., eMBB, URLLC, and mMTC, may be multiplexed and transmitted in one system. In this case, different transmission/reception techniques and transmission/reception parameters may be used between services to satisfy different requirements of each service. 5G is not limited to the above-described three services.

Hereinafter, a frame structure of the 5G system will be described in more detail with reference to the drawings.

FIG. 1 is a diagram illustrating a basic structure of a time-frequency domain, which is a radio resource domain in which data or control information is transmitted in a 5G communication system, according to an embodiment.

Referring to FIG. 1, the horizontal and vertical axes represent the time domain and the frequency domain, respectively. The basic unit of resource in the time domain and frequency domain is an RE 101, which may be defined as one OFDM symbol 102 in the time axis and may be defined as one subcarrier 103 in the frequency axis. In the frequency domain, $N_{sc}^{RB}$ (e.g., 12) consecutive REs may configure one RB 104.

Figure 2:
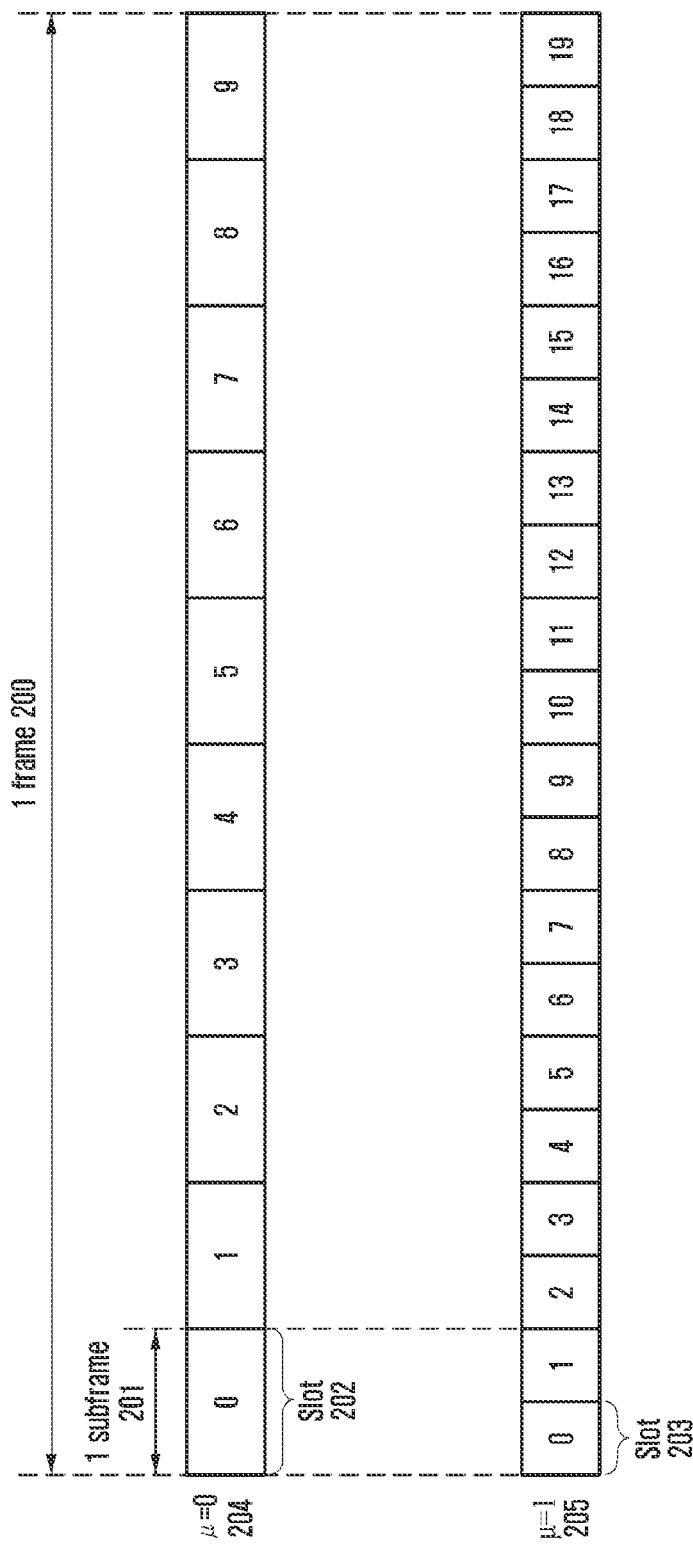
FIG. 2 is a diagram illustrating an example of a slot structure considered in a 5G system, according to an embodiment.

FIG. 2 is a diagram illustrating a slot structure considered in a 5G communication system, according to an embodiment.

FIG. 2 illustrates an example of a structure of a frame 200, a subframe 201, and a slot 202.

Referring to FIG. 2, one frame 200 may be defined as 10 ms. One subframe 201 may be defined as 1 ms, and in this case, one frame 200 may consist of a total of 10 subframes 201. Slots 202 and 203 may be defined as 14 OFDM symbols (that is, the number of symbols per slot ($N_{symb}^{slot}$)= 14). One subframe 201 may consist of one or more slots 202 and 203, and the number of slots 202 and 203 per one subframe 201 may vary according to a set value µ for the subcarrier spacing, where µ=0 at reference numeral 204 and µ=1 at reference numeral 205. When µ=0 204, one subframe 201 may consist of one slot 202, and when µ=1 205, one subframe 201 may consist of two slots 203. That is, depending on the set value µ for the subcarrier spacing, the number of slots per one subframe ($N_{slot}^{subframe,\mu}$) may vary, and accordingly, the number of slots per one frame ($N_{slot}^{frame,\mu}$) may vary. The $N_{slot}^{subframe,\mu}$ and $N_{slot}^{frame,\mu}$ according to each subcarrier spacing set value µ may be defined in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a BWP configuration in the 5G communication system w % ill be described in detail with reference to FIG. 3.

Figure 3:
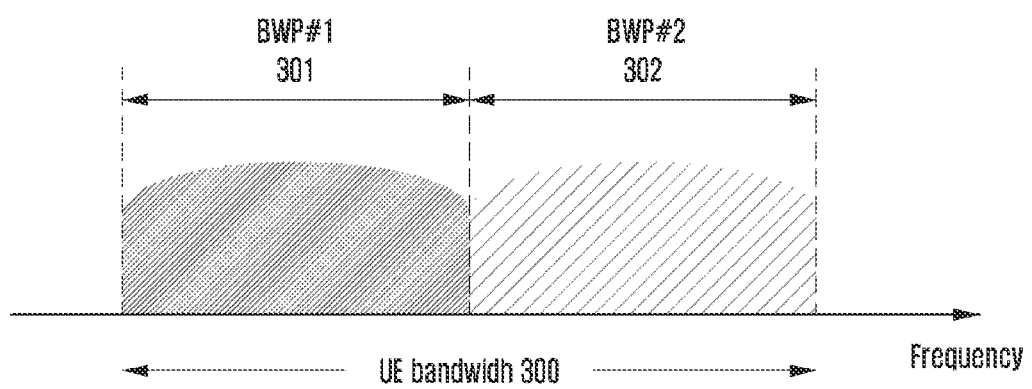
FIG. 3 is a diagram illustrating an example of configuring a bandwidth part (BWP) in a 5G communication system, according to an embodiment.

FIG. 3 is a diagram illustrating an example of configuring a BWP of a 5G communication system, according to an embodiment.

FIG. 3 illustrates an example in which the UE bandwidth 300 is configured to two BWPs, namely, BWP #1 301 and BWP #2 302. The base station may configure one or more BWPs to the UE, and may configure information, as shown below in Table 2, for each BWP.

TABLE 2

| BWP ::= | SEQUENCE { |
|---|---|
| bwp-Id | BWP-Id, |
| (BWP identifier (ID)) | |
| locationAndBandwidth | INTEGER (1..65536), |
| (BWP location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

Not limited to the above example, various parameters related to BWP may be configured in the UE in addition to the above-described configuration information. The above-described information may be transmitted by the base station to the UE through higher layer signaling, for example, radio resource control (RRC) signaling. At least one BWP among one or more configured BWPs may be activated. Whether to activate the configured BWP may be semi-statically transmitted from the base station to the UE through RRC signaling or may be dynamically transmitted through downlink control information (DCI).

The UE, before the RRC connection, may receive a configuration for an initial BWP for the initial connection from the base station through the master information block (MIB). More specifically, in the initial access step, the UE may receive the configuration information for the CORESET through which a physical downlink control channel (PDCCH) for receiving system information (e.g., remaining system information (RMSI) or system information block (SIB) 1) required for initial access can be transmitted. The UE may also receive a search space through the MIB. The CORESET and the search space configured by the MIB may be regarded as ID 0. The base station may notify the UE of configuration information such as frequency allocation information, time allocation information, and numerology for the CORESET #0 through the MIB. In addition, the base station may notify the UE through the MIB of configuration information on the monitoring period and occasion for the CORESET #0, that is, configuration information on the search space #0. The UE may regard the frequency domain configured as the CORESET #0 obtained from the MIB as an initial BWP for initial access. In this case, the ID of the initial BWP may be regarded as 0.

The configuration of the BWP supported by the 5G may be used for various purposes.

When the bandwidth supported by the UE is smaller than the system bandwidth, the UE may be supported through the BWP configuration. For example, the base station may configure the frequency position of the BWP (configuration information 2) to the UE, so that the UE may transmit and receive data at a specific frequency position within the system bandwidth.

In addition, for the purpose of supporting different numerologies, the base station may configure a plurality of BWPs to the UE. For example, to support both data transmission and reception using a subcarrier spacing of 15 kilohertz (kHz) and a subcarrier spacing of 30 kHz to an arbitrary UE, two BWPs may be configured as a subcarrier spacing of 15 kHz and 30 kHz, respectively. Different BWPs may be frequency division multiplexed (FDM), and when data is transmitted/received with a specific subcarrier space, a BWP configured for the corresponding subcarrier space may be activated.

In addition, for the purpose of reducing power consumption of the UE, the base station may configure BWPs having different bandwidths to the UE. For example, when the UE supports a very large bandwidth, for example, a bandwidth of 100 MHz and always transmits and receives data using the corresponding bandwidth, a lot of power may be consumed. Particularly, it is very inefficient in terms of power consumption for the UE to monitor the downlink control channel for an unnecessarily large bandwidth of 100 MHz in a situation in which there is no traffic. For reducing power consumption of the UE, the base station may configure a relatively small BWP to the UE, for example, a BWP of 20 MHz. In the absence of traffic, the UE may monitor in a BWP of 20 MHz, and when data are generated, the UE may transmit/receive data using the BWP of 100 MHz according to the indication of the base station.

In the method of configuring the BWP, the UEs before the RRC connection may receive the configuration information for the initial BWP through the MIB in the initial access step. More specifically, the UE may receive from the MIB of the physical broadcast channel (PBCH), a configuration for the CORESET for a downlink control channel through which DCI scheduling a SIB may be transmitted. The bandwidth of the CORESET configured through the MIB may be regarded as an initial BWP, and through the configured initial BWP, the UE may receive a PDSCH through which the SIB is transmitted. In addition to the purpose of receiving the SIB, the initial BWP may be utilized for other system information (OSI), paging, and random access.

Next, a synchronization signal (SS)/PBCH block in 5G will be described.

The SS/PBCH block may refer to a physical layer channel block composed of a primary SS (PSS), a secondary SS (SSS), and a PBCH. Specifically, PSS, SSS, PBCH, and SS/PBCH may be defined as follows:

PSS: a signal that serves as a reference of downlink time/frequency synchronization and provides some information on cell ID.

SSS: serves as a reference of downlink time/frequency synchronization, and provides remaining cell ID information not provided by PSS. Additionally, the SSS may serve as a reference signal for demodulation of the PBCH.

PBCH: provides essential system information necessary for transmitting and receiving data channel and control channel of the UE. The essential system information may include search space-related control information indicating radio resource mapping information of a control channel and scheduling control information on a separate data channel for transmitting system information.

SS/PBCH block: the SS/PBCH block consists of a combination of PSS, SSS, and PBCH. One or a plurality of SS/PBCH blocks may be transmitted within 5 ms, and each transmitted SS/PBCH block may be distinguished by an Index.

The UE may detect the PSS and SSS in the initial access stage and may decode the PBCH. The UE may obtain the MIB from the PBCH, and may receive the CORESET #0 (which may correspond to a CORESET having a CORESET Index of 0) configured therefrom. The UE may perform monitoring on the CORESET #0, assuming that the selected SS/PBCH block and a demodulation reference signal (DMRS) transmitted from the CORESET #0 are quasi co located (QCL). The UE may receive system information as DCI transmitted from the CORESET #0. The UE may obtain a random access channel (RACH) related configuration information required for initial access from the received system information. The UE may transmit a physical RACH (PRACH) to the base station in consideration of the selected SS/PBCH Index, and the base station receiving the PRACH may obtain information on the SS/PBCH block Index selected by the UE. The base station may check which block the UE selects from each of the SS/PBCH blocks, and may recognize the fact that the CORESET #0 associated with the selected block is monitored.

Next, DCI in the 5G communication system will be described in detail.

In the 5G communication system, scheduling information for uplink data (or a physical uplink shared channel (PUSCH)) or downlink data (or a PDSCH) may be transmitted from a base station to a UE through DCI. The UE may monitor a DCI format for fallback and a DCI format for non-fallback for PUSCH or PDSCH. The DCI format for fallback may consist of a fixed field predefined between the base station and the UE, and the DCI format for non-fallback may include a configurable field.

The DCI may be transmitted through a PDCCH after a channel coding and modulation process. A cyclic redundancy check (CRC) is attached to the DCI message payload, and the CRC may be scrambled with a radio network temporary ID (RNTI) corresponding to the identity of the UE. Different RNTIs may be used according to the purpose of the DCI message, for example, UE-specific data transmission, a power control command, or a random access response. That is, the RNTI is not explicitly transmitted, but is included in the CRC calculation process and transmitted. Upon receiving the DCI message transmitted over the PDCCH, the UE identifies the CRC using the assigned RNTI, and if the CRC identification result is correct, the UE may recognize that the message has been transmitted to the UE.

For example, DCI scheduling a PDSCH for system information (SI) may be scrambled with SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying a transmit power control (TPC) may be scrambled with a TPC-RNTI. DCI for scheduling UE-specific PDSCH or PUSCH may be scrambled with a cell-RNTI (C-RNTI).

DCI format 0_0 may be used as a fallback DCI for scheduling PUSCH, and in this case. CRC may be scrambled with C-RNTI. DCI format 0_0 in which CRC is scrambled with C-RNTI may include, for example, information as shown in Table 3 below.

TABLE 3

- Identifier for DCI formats - 1 bit
- The value of this bit field is always set to 0, indicating an UL DCI format
- Frequency domain resource assignment -
  $\lceil \log_2(N_{RB}^{UL,BWP}(N_{RB}^{UL,BWP} +1)/2) \rceil$ bits where $N_{RB}^{UL,BWP}$ is defined in subclause 7.3.1.0
- For PUSCH hopping with resource allocation type 1:
- $N_{UL\_hop}$ MSB bits are used to indicate the frequency offset according to Subclause 6.3 of [6, TS 38.214], where $N_{UL\_hop}$ = 1 if the higher layer parameter frequencyHoppingOffsetLists contains two offset values and $N_{UL\_hop}$ = 2 if the higher layer parameter frequencyHoppingOffsetLists contains four offset values
- $\lceil \log_2(N_{RB}^{UL,BWP}(N_{RB}^{UL,BWP} +1)/2) \rceil - N_{UL\_hop}$ bits provides the frequency domain resource allocation according to Subclause 6.1.2.2.2 of [6, TS 38.214]
- For non-PUSCH hopping with resource allocation type 1:
- $\lceil \log_2(N_{RB}^{UL,BWP}(N_{RB}^{UL,BWP} +1)/2) \rceil$ bits provides the frequency domain resource allocation according to Subclause 6.1.2.2.2 of [6, TS 38.214]
- Time domain resource assignment- 4 bits as defined in Subclause 6.1.2.1 of [6, TS 38.214]
- Frequency hopping flag - 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator -1 bit
- Redundancy version - 2 bits as defined in Table 7.3.1.1.1-2
- HARQ process number - 4 bits
- TPC command for scheduled PUSCH - 2 bits as defined in Subclause 7.1.1 of [5, TS 38.213]
- Padding bits, if required.
- UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bits(s).
- If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
- If the UL/SUL indicator is not present in DCI format 0_0 and pucch-Config is configured; the corresponding PUSCH scheduled by the DCI format 0_0 is for the UL or SUL for which high layer parameter pucch-Config is configured.
- If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as a non-fallback DCI for scheduling PUSCH, and in this case, CRC may be scrambled with C-RNTI. DCI format 0_1 in which CRC is scrambled with C-RNTI may include, for example, information as shown in Table 4 below.

TABLE 4

Identifier for DCI formats-1 bit
  The value of this bit field is always set to 0, indicating an UL-DCI format
Carrier indicator-0 or 3 bits, as defined in Subclause 10.1 of [5, TS38.213].
UL/SUL indicator-0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
- Bandwidth part indicator-0, 1 or 2 bits as determined by the number of UL BWPs $n_{BWP,RRC}$ configured by higher layers, excluding the initial UL bandwidth part. The bitwidth for this field is determined as $\lceil \log_2 (n_{BWP}) \rceil$ bits, where
  $n_{BWP} = n_{BWP,RRC} + 1$ if $n_{BWP,RRC} \leq 3$ in which case the bandwidth part indicator is equivalent to the ascending order of the higher layer parameter BWP-Id;
  otherwise $n_{BWP} = n_{BWP,RRC}$, in which case the bandwidth part indicator is defined in Table 7.3.1.1.2-1;
If a UE does not support active BWP change via DCI, the UE ignores this bit field.
Frequency domain resource assignment-number of bits determined by the following, where $N_{RB}^{UL,BWP}$ is the size of the active UL bandwidth pad:
  $N_{RBG}$ bits if only resource allocation type 0 is configured, where $N_{RBG}$ is defined in Subclause 6,1.2.2,1. of [6, TS 38.214],
  $\lceil \log_2 (N_{RB}^{UL,BWP} (N_{RB}^{UL,BWP} + 1)/2) \rceil$ bits if only resource allocation type 1 is configured, or
  max ($\lceil \log_2 (N_{RB}^{UL,BWP} (N_{RB}^{UL,BWP} + 1)/2) \rceil$, $N_{RBG}$) +1 bits if both resource allocation type 0 and 1 are configured.
  If both resource allocation type 0 and 1 are configured, the MSB bit is used to indicate resource allocation type 0 or resource allocation type 1. where the bit value of 0 indicates resource allocation type 0 and the bit value of 1 indicates resource allocation type 1.
  For resource allocation type 0, the $N_{RBG}$ LSBs provide the resource allocation as defined in Subclause 6,1,2,2.1 of [6, TS 38.214].

TABLE 4-continued

For resource allocation type 1, the $\lceil \log_2 (N_{RB}^{UL,BWP} (N_{RB}^{UL,BWP} + 1)/2) \rceil$ LSBs provide the resource allocation as follows:
    For PUSCH hopping with resource allocation type 1:
        $N_{UL\_hop}$ MSB bits are used to indicate the frequency offset according to
        Subclause 6.3 of [6, TS 38.214], where $N_{UL\_hop}$ = 1 if the higher layer
        parameter frequencyHoppingOffsetLists contains two offset values and
        $N_{UL\_hop}$ = 2 if the higher layer parameter frequencyHoppingOffsetLists contains
        four offset values
        $\lceil \log_2 (N_{RB}^{UL,BWP} (N_{RB}^{UL,BWP} + 1)/2) \rceil - N_{UL\_hop}$ bits provides the frequency domain
        resource allocation according to Subclause 6.1,2.2.2 of [6, Ts 38.214]
    For non-PUSCH hopping with resource allocation type 1:
        $\lceil \log_2 (N_{RB}^{UL,BWP} (N_{RB}^{UL,BWP} + 1)/2) \rceil$ bits provides the frequency domain resource
        allocation according to Subclause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment-0, 1, 2, 3, or 4 bits as defined in Subclause 6.1.2.1 of [6, TS38.214]. The bitwidth for this field is determined as $\lceil \log_2 (I) \rceil$ bits, where I is the number of entries in the higher layer parameter pusch-TimeDomainAllocationList if the higher layer parameter is configured; otherwise I is the number of entries in the default table.
Frequency hopping flag-0 or 1 bit:
    0 bit if only resource allocation type 0 is configured or if the higher layer parameter frequencyHopping is not configured;
    1 bit according to Table 7.3.1.1.1-3 otherwise, only applicable to resource allocation type 1, as defined in Subclause 6.3 of [6, TS 38.214].
Modulation and coding scheme-5 bits as defined in Subclause 6.1.4.1 of [6, TS 38.214]
New data indicator-1 bit
Redundancy version-2 bits as defined in Table 7.3.1.1.1-2
HARQ process number-4 bits
$1^{st}$ downlink assignment index-1 or 2 bits:
    1 bit for semi-static HARQ-ACK codebook;
    2 bits for dynamic HARQ-ACK codebook.
$2^{nd}$ downlink assignment index-0 or 2 bits:
    2 bits for dynamic HARQ-ACK codebook with two HARQ-ACK sub-codebooks;
    0 bit otherwise.
TPC command for scheduled PUSCH-2 bits as defined in Subclause 7.1.1 of [5, TS38.213]
SRS resource indicator (Sounding Reference Signal; SRS) resource indicator)-

$$\left\lceil \log_2 \left( \sum_{k=1}^{min(L_{max}, N_{SRS})} \binom{N_{SRS}}{k} \right) \right\rceil$$

configured SRS resources in the SRS resource set associated with the higher layer parameter usage of value 'codeBook' or 'nonCodeBook', $$\left\lceil \log_2 \left( \sum_{k=1}^{min(L_{max}, N_{SRS})} \binom{N_{SRS}}{k} \right) \right\rceil$$

higher layer parameter txConfig = nonCodebook, where $N_{SRS}$ is the number of
    configured SRS resources in the SRS resource set associated with the higher layer
    parameter usage of value 'nonCodeBook' and
        if UE supports operation with maxMIMO-Layers and the higher layer parameter
        maxMIMO-Layers of PUSCH-ServingCellConfig of the serving cell is configured,
        $L_{max}$ is given by that parameter
        otherwise, $L_{max}$ is given by the maximum number of layers for PUSCH supported
        by the UE for the serving cell for non-codebook based operation.
$\lceil \log_2 (N_{SRS}) \rceil$ bits according to Tables 73.1.1.2-32 if the higher layer parameter txConfig = codebook, where $N_{SRS}$ is the number of configured SRS resources in the SRS resource set associated with the higher layer parameter usage of value 'codeBook'.
Precoding htformation and number of layers-number of bits determined by the following:
0 bits if the higher layer parameter txConfig = nonCodeBook;
0 bits for 1 antenna port and if the higher layer parameter txConfig = codebook;
4, 5, or 6 bits according to Table 7.3.1.1.2-2 for 4 antenna ports, if txConfig = codebook; and according to whether transform precoder is enabled of disabled, and the values of higher layer parameters maxRank, and codebookSubset;
2, 4, or 5 bits according to Table 7.3.1.1.2-3 for 4 antenna ports, if txConfig = codebook and according to whether transform precoder is enabled or disabled, and the values of higher layer parameters maxRank, and codebookSubset;
2 of 4 bits according to Table7.3.1.1.2-4 for 2 antenna ports, if txConfig = codebook, and according to whether transform precoder is enabled or disabled, and the values of higher layer parameters maxRank and codebookSubset;

TABLE 4-continued 1 or 3 bits according to Table7.3.1.1.2-5 for 2 antenna ports, if txConfig = codebook, and according to whether transform precoder is enabled or disabled, and the values of higher layer parameters maxRank and codebookSubset.

Antenna ports-number of bits determined by the following
    2 bits as defined by Tables 7.3.1.1.2-6, if transform precoder is enabled, dmrs-Type = 1. and maxLength = 1;
    4 bits as defined by Tables 7.3.1.1.2-7, if transform precoder is enabled, dmrs-Type = 1, and maxLength = 2;
    3 bits as defined by Tables 7.3.1.1.2-8/9/10/11, if transform precoder is disabled, dmrs-Type = 1, and maxLength = 1, and the value of rank is determined according to the SRS resource indicator field if the higher layer parametertxConfig = nonCodebook and according to the Precoding information and number of layers field if the higher layer parameter txConfig = codebook;
    4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook;
    4 bits as defined by Tables 7.311.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook;
    5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook.

where the number of CDM groups without data of values 1, 2, and 3 in Tables 7.3.1.1.2-6 to 7.3.1.1.2-23 refers to CDM groups $\{0\}$, $\{0,1\}$, and $\{0, 1, 2\}$ respectively.

If a UE is configured with both dmrs-UplinkbarPUSCH4-MappingTypeA and dmrs-UplinkForPUSCH-MappingTypeB, the bitwidth of this field equals max $\{x_A, x_B\}$, there $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.

SRS request-2 bits as defined by Table 7.3.1.1.2-24 for UEs not configured with supplementaryUplink in ServingCellConfig in the cell; 3 bits for UEs configured with supplementaryUplink in, ServingCellConfig in the cell where the first bit is the non-SUL/SUL indicator as defined in Table 7.3.1.1.14 and the second and third bits are defined by Table 7.3.1.1.2-24. This bit field may also indicate the associated CSI-RS according to Subclause 6.1.1.2 of [6, TS 38.214].

CSI request (Channel State Information; CSI request)-0, 1, 2, 3, 4, 5, or 6 bits determined by higher layer parameter reportTriggerSize.

CBG transmission information (CBGTI) (Code Block Group; CBG transmission information)-0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.

PTRS-DMRS association (Phase Tracking Reference Signal-Demodulation Reference Signal association)-number of bits determined as follows
    0 bit if PTRS-Uplink-Config is not configured and transform precoder is disabled, or if transform precoder is enabled, or if maxRank = 1;
    2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.

If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part.

beta_offset indicator-0 if the higher layer parameter betaOffsets = semiStatic; otherwise 2 bits as defined by Table 9.3-3 in [5, TS 38.213].

DMRS sequence initialization-0 bit if transform precoder is enabled; 1 bit if transform precoder is disabled.

UL-SCH indicator-1 bit. A value of "1" indicates UL-SCH shall be transmitted on the PUSCH and a value of "0" indicates UL-SCH shall not be transmitted on the PUSCH. Except for DcI format 0_1 with CRC scrambled by SP-CSI-RNTI, a UE is not expected to receive a DCI format 0_1 with UL-SCH indicator of "0" and CSI request of all zero(s).

DCI format 1_0 may be used as a failback DCI for scheduling PDSCH, and in this case, CRC may be scrambled with C-RNTI. DCI format 1_0 in which CRC is scrambled with C-RNTI may include, for example, information as shown in Table 5 below.

TABLE 5

- Identifier for DCI formats - 1 bits
  - The value of this bit field is always set to 1, indicating a DL DCI format
- Frequency domain resource assignment - $\lceil \log_2(N_{RB}^{DL,BWP}(N_{RB}^{DL,BWP}+1)/2) \rceil$ bits where $N_{RB}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
- Random Access Preamble index - 6 bits according to ra-PreambleIndex in Subclause 5.1.2 of [8, TS38.321]
- UL/SUL indicator - 1 bit. if the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved
- SS/PBCH index- 6 bits. If the value of the "Random Access Preamble index" is not all zeros, this field indicates the SS/PBCH that shall be used to determine the RACH occasion for the PRACH transmission; otherwise, this field is reserved.
- PRACH Mask index- 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved
- Reserved bits - 10 bits Otherwise, all remaining fields are set as follows:
- Time domain resource assignment - 4 bits as defined in Subclause 5.1.2.1 of [6, TS 38.214]
- VRB-to-PRB mapping (virtual resource block-to-physical resource block mapping) - 1 bit according to Table 7.3.1.2.2-5
- Modulation and coding scheme - 5 bits as defined in Subclause 5.1.3 of [6, TS 38.214]
- New data indicator - 1 bit
- Redundancy version - 2 bits as defined in Table 7.3.1.1.1-2
- HARQ process number – 4 bits
- Downlink assignment index - 2 bits as defined in Subclause 9.1.3 of [5, TS 38.213], as counter DAI
- TPC command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 3 bits as defined in Subclause 9.2.3 of [5, TS38.213]

DCI format 1_1 may be used as a non-fallback DCI for scheduling PDSCH, and in this case, CRC may be scrambled with C-RNTI. DCI format 1_1 in which CRC is scrambled with C-RNTI may include, for example, the information shown in Table 6 below.

TABLE 6

- Identifier for DCI formats - 1 bits
  - The value of this bit field is always set to 1, indicating a DL DCI format
- Carrier indicator - 0 or 3 bits as defined in Subclause 10.1 of [5, TS 38.213].
- Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
  - $n_{BWP} = n_{BWP,RRC} + 1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the LTE ignores this bit field.
- Frequency domain resource assignment - number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $\lceil \log_2(N_{RB}^{DL,BWP}(N_{RB}^{DL,BWP}+1)/2) \rceil$ bits if only resource allocation type 1 is configured, or
  - max $\lceil \log_2(N_{RB}^{DL,BWP}(N_{RB}^{DL,BWP}+1)/2) \rceil$, $N_{RBG}$)+1 bits if both resource allocation type 0 and 1 are configured.
  - If both resource allocation type 0 and 1 are configured, the MSB bit is used to indicate resource allocation type 0 of resource allocation type 1, where the bit value of 0 indicates resource allocation type 0 and the bit value of 1 indicates resource allocation type 1.

TABLE 6-continued

- For resource allocation type 0, the $N_{RBG}$ LSBs provide the resource allocation as defined in Subclause 5.1.2.2.1 of [6, TS 38.214].
- For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

- Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise the number of entries in the default table.
- VRB-to-PRB mapping - 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211].
- PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
- Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- ZP CSI-RS trigger - 0, 1, or 2 bits as defined in Subclause 5.1.4.2 of [6, TS 38.214]. The bitwidth for this field is determined as $\lceil \log_2(n_{ZP}+1) \rceil$ bits, where $n_{ZP}$ is the number of aperiodic ZP CSI-RS resource sets configured by higher layer.

For transport block 1:
    Modulation and coding scheme - 5 bits as defined in Subclause 5.1.3.1 of [6, TS 38.214]
    New data indicator - 1 bit
    Redundancy version - 2 bits as defined in Table 7.3.1.1.1-2

For transport block 2 (only present if maxNrofCodeWordsScheduledByDCI equals 2):
- Modulation and coding scheme - 5 bits as defined in Subclause 5.1.3.1 of [6, TS 38.214
- New data indicator - 1 bit
- Redundancy version - 2 bits as defined in Table 7.3.1.1.1-2

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.

- HARQ process number - 4 bits
- Downlink assignment index - number of bits as defined in the following
  - 4 bits if more than one serving cell are configured in the DL and the higher layer parameter pdsch-HARQ-ACK-Codebook=dynamic, where the 2 MSB bits are the counter DAI and the 2 LSB bits are the total DAI;
  - 2 bits if only one serving cell is configured in the DL and the higher layer parameter pdsch-HARQ-ACK-Codebook=dynamic, where the 2 bits are the counter DAI;
  - 0 bits otherwise.
- TPC command for scheduled PUCCH- 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 0, 1, 2, or 3 bits as defined in Subclause 9.2.3 of [5, TS 38.213]. The bitwidth for this field is determined $\lceil \log_2(I) \rceil$ as bits, where I is the number of entries in the higher layer parameter dl-DataToUL-ACK.
- Antenna port(s) - 4, 5, or 6 bits as defined by Tables 7.3.1.2.2-1/2/3/4, where the number of CDM groups without data of values 1, 2, and 3 refers to CDM groups {0}, {0,1}, and {0, 1,2}respectively. The antenna ports $\{p_0, \ldots, p_{v-1}\}$ shall be determined according to the ordering of DMRS port(s) given by Tables 7.3.1.2.2-1/2/3/4.

If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.

- Transmission configuration indication - 0 bit if higher layer parameter tci-PresentInDCI is not enabled; otherwise 3 bits as defined in Subclause 5.1.5 of [6, TS38.214].

TABLE 6-continued

If "Bandwidth part indicator" field indicates a bandwidth part other than the active
bandwidth part,
- if the higher layer parameter tci-PresentInDCI is not enabled for the CORESET used
  for the PDCCH carrying the DCI format 1_1,
  - the UE assumes tci-PresentInDCI is not enabled for all CORESETs in the indicated
    bandwidth part;
- otherwise,
  - the UE assumes tci-PresentInDCI is enabled for all CORESETs in the indicated
    bandwidth part.
- SRS request - 2 bits as defined by Table 7.3.1.1.2-24 for UEs not configured with
  supplementaryUplink in ServingCellConfig in the cell; 3 bits for UEs configured with
  supplementaryUplink in ServingCellConfig in the cell where the first bit is the non-
  SUL/SUL indicator as defined in Table 7.3.1.1.1-1 and the second and third bits are
  defined by Table 7.3.1.1.2-24. This bit field may also indicate the associated CSI-RS
  according to Subclause 6.1.1.2 of [6, TS 38.214]
- CBG transmission information - 0 bit if higher layer parameter
  codeBlockGroupTransmission for PDSCH is not configured, otherwise, 2, 4, 6, or 8 bits as
  defined in Subclause 5.1.7 of [6, TS38.214], determined by the higher layer parameters
  maxCodeBlockGroupsPerTransportBlock and maxNrofCodeWordsScheduledByDCI for
  the PDSCH.
- CBG flushing out information - 1 bit if higher layer parameter
  codeBlockGroupFlushIndicator is configured as "TRUE", 0 bit otherwise.
- DMRS sequence initialization - 1 bit.

Hereinafter, a method of allocating time domain resources for a data channel in a 5G communication system will be described.

The base station may configure the table for time domain resource allocation information for the downlink data channel (e.g., the PDSCH) and the uplink data channel (e.g., the PUSCH) through higher layer signaling (e.g., RRC signaling) to the UE. The base station may configure a table consisting of a maximum of maxNrofDL-Allocations=16 entries for the PDSCH, and may configure a table consisting of a maximum of maxNrofUL-Allocations=16 entries for the PUSCH. The time domain resource allocation information may include, for example, PDCCH-to-PDSCH slot timing (corresponds to the time interval in slot units between the time when the PDCCH is received and the time when the PDSCH scheduled by the received PDCCH is transmitted, denoted by K0) or PDCCH-to-PUSCH slot timing (corresponds to the time interval in slot units between the time when the PDCCH is received and the time when the PUSCH scheduled by the received PDCCH is transmitted, denoted by K2), information on the position and length of a start symbol in which a PDSCH or PUSCH is scheduled in the slot, and mapping type of a PDSCH or PUSCH. For example, the information shown below in Table 7 may be notified from the base station to the UE and the information shown below in Table 8 may be notified from the UE to the base station.

TABLE 7

PDSCH-TimeDomainResourceAllocationList information element

```
PDSCH-TimeDomainResourceAllocationList    ::=  SEQUENCE (SIZE(1..maxNrofDL-Allocations)) OF PDSCH-
TimeDomainResourceAllocation
PDSCH-TimeDomainResourceAllocation ::= SEQUENCE {
    k0                                 INTEGER(0..32)                    OPTIONAL, -- Need S
    (PDCCH-to-PDSCH timing, per slot)
    mapping,Type                       ENUMERATED {typeA, typeB},
    (PDSCH mapping type)
    startSymbolAndLength               INTEGER (0..127)
    (Start symbol and length of PDSCH)
}
```

TABLE 8

PUSCH-TimeDomainResourceAllocation information element

```
PUSCH-TimeDomainResourceAllocationList ::=    SEQUENCE (SIZE(1..maxNrofUL-Allocations)) OF PUSCH-
TimeDomainResourceAllocation
PUSCH-TimeDomainResourceAllocation ::=        SEQUENCE {
    k2                                        INTEGER(0..32)    OPTIONAL,   -- Need S
    (PDCCH-to-PDSCH timing, per slot)
    mappingType                               ENUMERATED {typeA, typeB},
    (PUSCH mapping type)
    startSymbolAndLength                      INTEGER (0..127)
    (Start symbol and length of PDSCH)
}
```

The base station may notify the UE of one of the entries in the table for the time domain resource allocation information through L1 signaling (e.g., DCI) (for example, the base station indicates with the "time domain resource allocation" field in DCI). The UE may obtain time domain resource allocation information for the PDSCH or PUSCH based on the DCI received from the base station.

Hereinafter, a method of allocating a frequency domain resource for a data channel in a 5G communication system will be described.

In 5G, resource allocation type 0 and resource allocation type 1 are supported as a method of indicating frequency domain resource allocation information for a downlink data channel (e.g., a PDSCH) and an uplink data channel (e.g., a PUSCH).

Resource Allocation Type 0

RB allocation information may be notified from the base station to the UE in the form of a bitmap for a RB group (RBG). In this case, the RBG may be composed of a set of consecutive VRBs, and the size P of the RBG may be determined based on a value configured by a higher layer parameter (rbg-Size) and a size value of the BWP defined below in Table 9.

TABLE 9

| BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number ($N_{RBG}$) of RBGs of BWP i of size $N_{BWP,i}^{size}$ may be defined based on Equation (1) as follows:

$$N_{RBG} = \lceil (N_{BWP,i}^{size} + (N_{BWP,i}^{start} \bmod P))/P \rceil \quad \text{Equation (1)}$$

where the size of the first RBG is $RBG_0^{size} = P - N_{BWP,i}^{start} \bmod P$, the size of last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise, and the size of all other RBGs is P.

Each bit of the $N_{RBG}$ bit-sized bitmap may correspond to each RBG. RBGs may be Indexed in order of increasing frequency, starting from the lowest frequency position of the BWP. For $N_{RBG}$ RBGs in the BWP, RBG #0 to RBG #($N_{RBG}-1$) may be mapped from most significant bit (MSB) to least significant bit (LSB) of the RBG bitmap. When a specific bit value in the bitmap is 1, the UE may determine that the RBG corresponding to the bit value is allocated, and when a specific bit value in the bitmap is 0, the UE may determine that the RBG corresponding to the bit value is not allocated.

Resource Allocation Type 1

RB allocation information may be notified from the base station to the UE as information on the start position and length of continuously allocated VRBs. In this case, interleaving or non-interleaving may be additionally applied to consecutively allocated VRBs. The resource allocation field of resource allocation type 1 may consist of a resource indication value (RIV), and the RIV may be composed of a starting point ($RB_{start}$) of a VRB and a length of a continuously allocated RB ($L_{RBs}$). More specifically, the RIV in the BWP of the $N_{BWP}^{size}$ size may be defined as follows:

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs} \geq 1$ and shall not exceed $N_{BWP}^{size} - RB_{start}$.

Hereinafter, a downlink control channel in a 5G communication system will be described in more detail with reference to the drawings.

Figure 4:
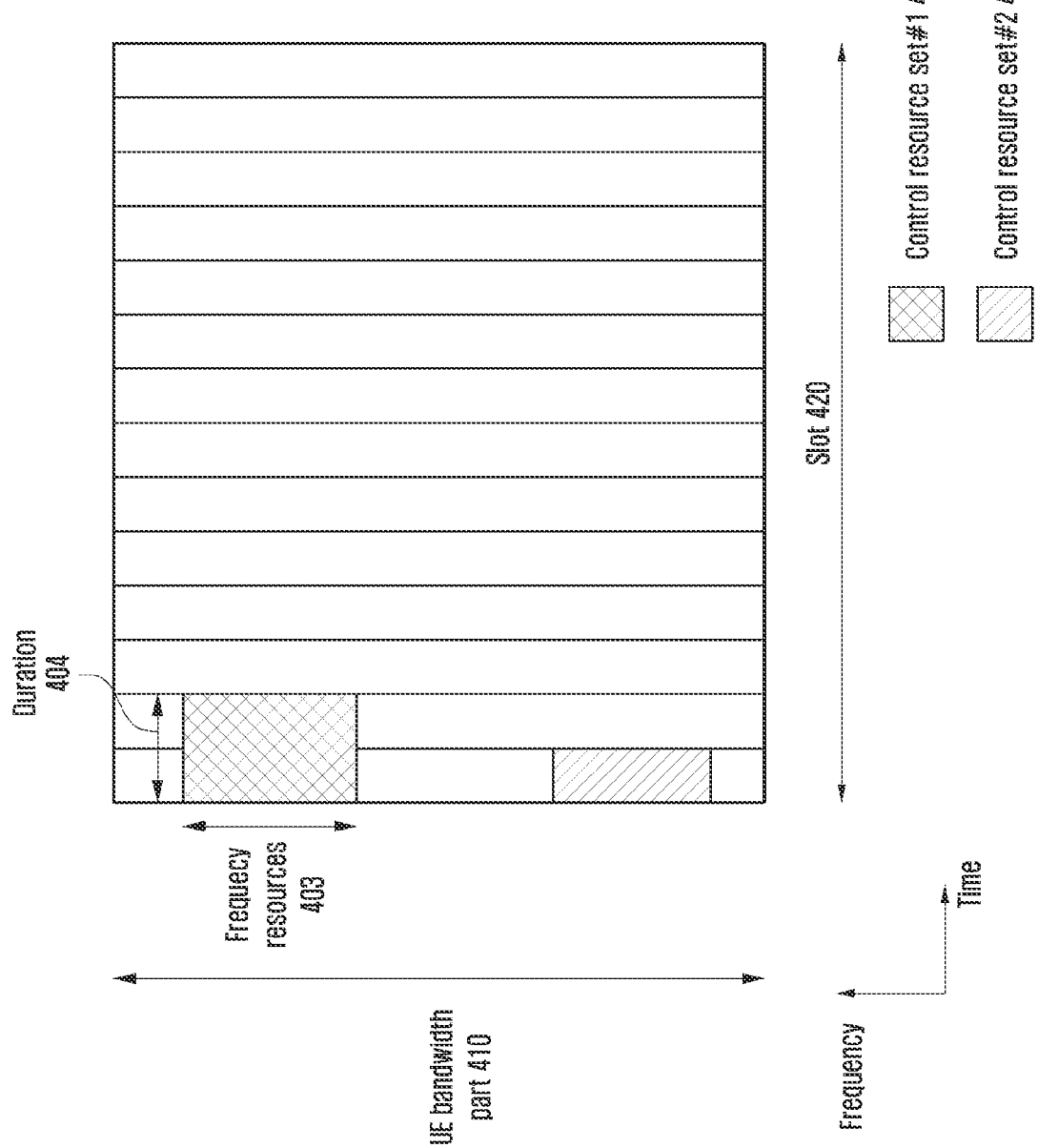
FIG. 4 is a diagram illustrating an example of a control resource set (CORESET) through which a downlink control channel is transmitted in a 5G wireless communication system, according to an embodiment.

FIG. 4 is a diagram illustrating an example of a CORE-SET in which a downlink control channel is transmitted in a 5G wireless communication system, according to an embodiment.

Referring to FIG. 4, UE BWP 410 is configured on the frequency axis and two control sets, CORESET #1 401 and CORESET #2 402 are configured in one slot 420 on the time axis. The CORESETs 401 and 402 may be configured to a specific frequency resource 403 within the entire UE BWP 410 on the frequency domain. One or a plurality of OFDM symbols may be configured on the time domain, and this may be defined as CORESET duration 404. Referring to the example illustrated in FIG. 4, CORESET #1 401 may be configured to a CORESET length of 2 symbols, and CORESET #2 402 may be configured to a CORESET length of 1 symbol.

The CORESET in the above-described 5G may be configured by the base station to the UE through higher layer signaling (e.g., system information, MIB, or RRC signaling). Configuring the CORESET to the UE refers to providing information such as a CORESET ID, a frequency position of the CORESET, and a symbol length of the CORESET. For example, the information provided to configure the CORESET is shown below in Table 10.

TABLE 10

```
ControlResourceSet ::=               SEQUENCE {
    -- Corresponds to L1 parameter 'CORESET-ID'
    controlResourceSetId             ControlResourceSetId,
    (CORESET Identity))
    frequencyDomainResources         BIT STRING (SIZE (45)),
    (Frequency Domain Resource allocation information)
    duration                         INTEGER (1..maxCoReSetDuration),
    (Time Domain Resource allocation information)
    cce-REG-MappingType              CHOICE {
        interleaved                  SEQUENCE {
            reg-BundleSize           ENUMERATED {n2, n3, n6},
            precoderGranularity      ENUMERATED {sameAsREG-bundle,
        allContiguousRBs},
            interleaverSize          ENUMERATED {n2, n3, n6}
            shiftIndex
            INTEGER(0..maxNrofPhysicalResourceBlocks-1)
            (Interleaver Shift))
        },
```

TABLE 10-continued

|  |  |
|---|---|
| nonInterleaved }, | NULL |
| tci-StatesPDCCH StatesPDCCH)) OF TCI-StateId (QCL configuration information) | SEQUENCE(SIZE (1..maxNrofTCI- OPTIONAL, |
| tci-PresentInDCI } | ENUMERATED {enabled} |

In Table 10, the tci-StatesPDCCH (a transmission configuration indication (TCI) state) configuration information may include information on one or more SS/PBCH block Indexes in a QCL relationship with DMRS transmitted in corresponding CORESET or CSI-RS Indexes.

Figure 5:
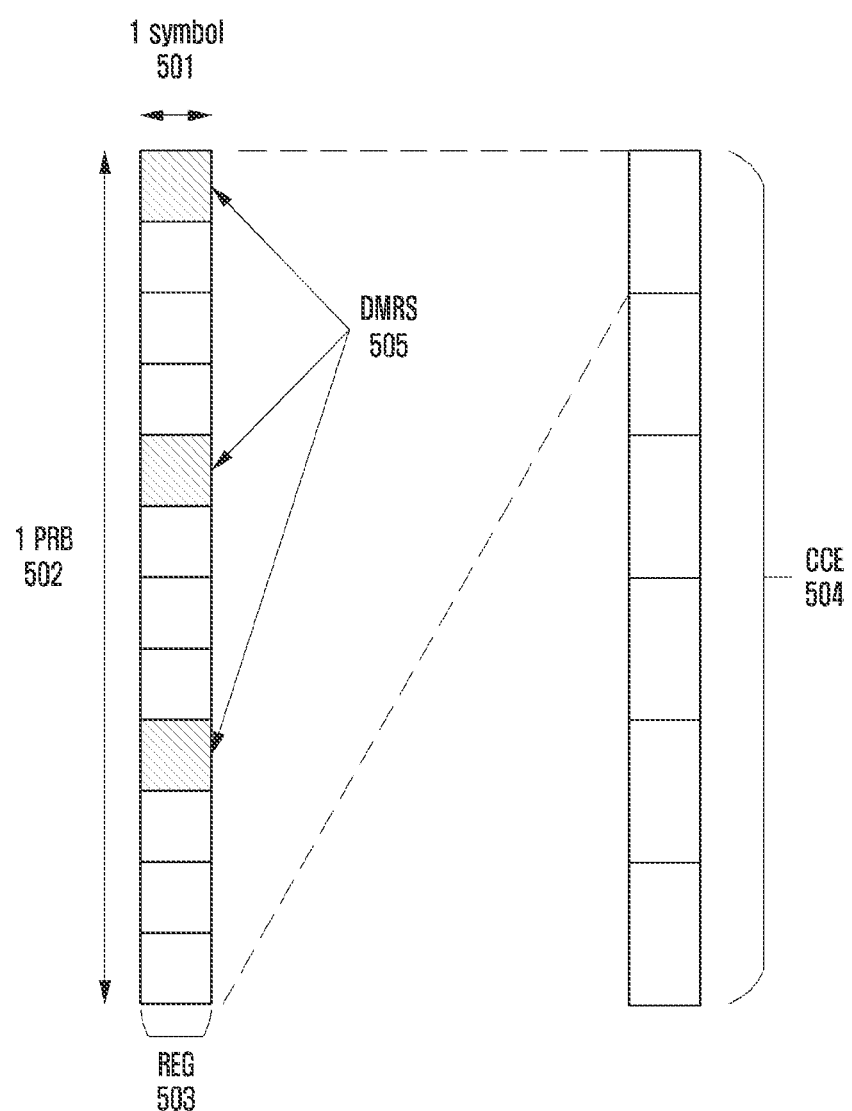
FIG. 5 is a diagram illustrating an example of a basic unit of time and frequency resources constituting a downlink control channel that can be used in 5G, according to an embodiment.

FIG. 5 is a diagram illustrating an example of a basic unit of time and frequency resources constituting a downlink control channel that can be used in 5G, according to an embodiment.

Referring to FIG. 5, the basic unit of time and frequency resources constituting the control channel may be referred to as a resource element group (REG) 503, and the REG 503 may be defined as 1 OFDM symbol 501 on the time axis and 1 physical resource block (PRB) 502 on the frequency axis, that is, 12 subcarriers. The base station may configure a downlink control channel allocation unit by concatenating the REG 503.

As illustrated in FIG. 5, the basic unit to which a downlink control channel is allocated in a 5G communication system is referred to as a control channel element (CCE) 504, and one CCE 504 may be composed of a plurality of REGs 503. Describing the REG 503 illustrated in FIG. 5, REG 503 may be composed of 12 REs, and if 1 CCE 504 is composed of 6 REGs 503, 1 CCE 504 may be composed of 72 REs. When the downlink CORESET is configured, the corresponding area may be composed of a plurality of CCEs 504, and a specific downlink control channel is mapped to one or more CCEs 504 according to the aggregation level (AL) in the control area and transmitted. The plurality of CCEs 504 in the CORESET may be assigned according to a logical mapping method.

The basic unit of the downlink control channel, i.e., REG 503 illustrated in FIG. 5, may include both REs to which DCI is mapped and areas to which a DMRS which is a RS for decoding the REs, is mapped. As in FIG. 5, 3 DMRSs 505 may be transmitted within one REG 503. The number of CCEs required to transmit the PDCCH may be 1, 2, 4, 8, or 16 depending on the AL, and different numbers of CCEs may be used to implement link adaptation of the downlink control channel. For example, when AL=L, one downlink control channel may be transmitted through L CCEs. The UE may need to detect a signal without figuring out information on the downlink control channel, and for blind decoding, a search space indicating a set of CCEs may be defined. Because the search space may be a set of downlink control channel candidates consisting of CCEs that the UE should attempt to decode on a given aggregation level, and there are several aggregation levels that make one bundle with 1, 2, 4, 8 or 16 CCEs, the UE may have a plurality of search spaces. The search space set may be defined as a set of search spaces in all configured aggregation levels.

The search space may be classified into a common search space and a UE-specific search space. A certain group of UEs or all UEs may examine the common search space of the PDCCH to receive cell-common control information, such as dynamic scheduling for system information or a paging message. The UEs may receive the PDSCH scheduling allocation information for transmission of the SIB including the operator information of the cell by examining the common search space of the PDCCH.

In the case of the common search space, because a certain group of UEs or all UEs must receive the PDCCH, the common search space may be defined as a set of promised CCEs. The scheduling assignment information for the UE-specific PDSCH or PUSCH may be received by examining the UE-specific search space of the PDCCH. The UE-specific search space may be UE-specifically defined as a function of the UE's identity and various system parameters.

In the 5G, the parameter for the search space for the PDCCH may be configured from the base station to the UE through higher layer signaling (e.g., SIB, MIB, and RRC signaling). The base station may configure the number of PDCCH candidates in each aggregation level L, a monitoring period for the search space, a monitoring occasion in symbol units in a slot for a search space, a search space type (a common search space or UE-specific search space), a combination of a DCI format and RNTI to be monitored in the corresponding search space, or a CORESET Index for monitoring the search space to the UE. The parameter for the search space for the PDCCH may include the following information shown below in Table 11.

TABLE 11

| SearchSpace ::= | SEQUENCE { |
|---|---|
| colspan="2" | -- Identity of the search space. SearchSpaceId = 0 identifies the SearchSpace configured via PBCH (MIB) or ServingCellConfigCommon. |
| searchSpaceId | SearchSpaceId, |
| controlResourceSetId | ControlResourceSetId, |
| monitoringSlotPeriodicityAndOffset (monitoring slot level periodicity) | CHOICE { |
| sl1 | NULL, |
| sl2 | INTEGER (0..1), |
| sl4 | INTEGER (0..3), |
| sl5 | INTEGER (0..4), |
| sl8 | INTEGER (0..7), |
| sl10 | INTEGER (0..9), |
| sl16 | INTEGER (0..15), |
| sl20 | INTEGER (0..19) |
| } |  |

TABLE 11-continued

| | |
|---|---|
| duration(monitoring length) | INTEGER (2..2559) |
| monitoringSymbolsWithinSlot (monitoring symbols within slot) | BIT STRING (SIZE. (14)) |
| nrofCandidates (number of PDCCH candidates by aggregation level) | SEQUENCE { |
|     aggregationLevel1 | ENUMERATED {n0, n1, n2, n3, n4, n5, n6, n8}, |
|     aggregationLevel2 | ENUMERATED {n0, n1, n2, n3, n4, n5, n6, n8}, |
|     aggregationLevel4 | ENUMERATED {n0, n1, n2, n3, n4, n5, n6, n8}, |
|     aggregationLevel8 | ENUMERATED {n0, n1, n2, n3, n4, n5, n6, n8}, |
|     aggregationLevel16 | ENUMERATED {n0, n1, n2, n3, n4, n5, n6, n8} |
| }, | |
| searchSpaceType | CHOICE { |
|   -- Configures this search space as common search space (CSS) and DCI formats to monitor, | |
|     common (common search space) | SEQUENCE { |
|     } | |
|     ue-Specific (UE-specific search space) | SEQUENCE{ |
|       -- Indicates whether the UE monitors in this USS for DCI formats 0-0 and 1-0 or for formats 0-1 and 1-1. | |
|       formats | ENUMERATED {formats0-0-And-1-0, formats0-1-And-1-1}, |
|       . . . | |
|     } | |

According to the configuration information, the base station may configure one or a plurality of search space sets to the UE. The base station may configure the search space set 1 and the search space set 2 to the UE. In search space set 1, the UE may be configured to monitor DCI format. A scrambled with X-RNTI in a common search space, and in search space set 2, the UE may be configured to monitor DCI format B scrambled with Y-RNTI in the UE-specific search space.

According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space.

In the common search space, a combination of the following DCI format and RNTI may be monitored. Not limited to the following examples.

DCI format 0_0/1_0 with CRC scrambled by C-RNTI, configured scheduling (CS)-RNTI. SP-CSI-RNTI, random access (RA)-RNTI, temporary cell (TC)-RNTI, paging (P)-RNTI, system information (SI)-RNTI DCI format 2_0 with CRC scrambled by SFI-RNTI DCI format 2_1 with CRC scrambled by interruption (INT)-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of the following DCI format and RNTI may be monitored. Not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and uses below.

C-RNTI: UE-specific PDSCH scheduling purpose

TC-RNTI: UE-specific PDSCH scheduling purpose

CS-RNTI: Semi-statically configured UE-specific PDSCH scheduling purpose

RA-RNTI: PDSCH scheduling purpose in the random access phase

P-RNTI: PDSCH scheduling purpose for which paging is transmitted

SI-RNTI: PDSCH scheduling purpose in which system information is transmitted

INT-RNTI: Used to indicate whether PDSCH is puncturing

TPC-PUSCH-RNTI: Used to indicate power control command for PUSCH

TPC-PUCCH-RNTI: Used to indicate power control command for PUCCH

TPC-SRS-RNTI: Used to indicate power control command for SRS

The above specified DCI formats may follow the definitions shown below in Table 12.

TABLE 12

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G, the search space of the aggregation level L in the CORESET p and the search space set s may be expressed in Equation (2), shown below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{Equation (2)}$$

where:

L: aggregation level;

$n_{CI}$: carrier Index;

$N_{CCE,p}$: the total number of CCEs present in the control area p;

$n_{s,f}^\mu$: slot Index;

$M_{p,s,max}^{(L)}$: the number of PDCCH candidates of aggregation level L;

$m_{snCI}=0, \ldots, M_{p,s,max}^{(L)}-1$: PDCCH candidate Index of aggregation level L;

$i=0, \ldots, L-1$;

$Y_{p,n_{s,f}^\mu}=(A_p \cdot Y_{p,n_{s,f}^\mu}) \bmod D$, $Y_{p,-1}=n_{RNTI} \neq 0$, $A_0=39827$, $A_1=39829$, $A_2=39839$, $D=6553$'; and $n_{RNTI}$: UE identity The Y_(p,$n_{s,f}^\mu$) value may correspond to 0 in the case of a common search space.

The Y_(p,$n_{s,f}^\mu$) value may correspond to a value that changes depending on the UE's identity (C-RNTI or ID configured for the UE by the base station) and the time Index in the UE-specific search space.

In 5G, as a plurality of search space sets may be configured with different parameters (e.g., parameters in Table 10), the set of search space sets monitored by the UE at every time point may vary. For example, if search space set #1 is configured to X-slot period and search space set #2 is configured to Y-slot period and X and Y are different, the UE may monitor both the search space set #1 and the search space set #2 in a specific slot, and may monitor one of the search space set #1 and the search space set #2 in another specific slot.

When a plurality of search space sets are configured to the UE, the following conditions may be considered in a method for determining the search space set to be monitored by the UE.

[Condition 1: Limit the Maximum Number of PDCCH Candidates]

The number of PDCCH candidates that can be monitored per slot does not exceed $M^\mu$. $M^\mu$ may be defined as the maximum number of PDCCH candidates per slot in a cell configured to a subcarrier interval of $15 \cdot 2^\mu$ kHz, and may be defined in Table 13 below.

TABLE 13

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit the Maximum Number of CCEs]

The number of CCEs constituting the entire search space per slot (the total search space refers to the entire set of CCEs corresponding to the union region of a plurality of search space sets) does not exceed $C^\mu$. $C^\mu$ may be defined as the maximum number of CCEs per slot in a cell configured to a subcarrier spacing of $15 \cdot 2^\mu$ kHz, and may be defined in Table 14 below

TABLE 14

| μ | Maximum number of CCEs per slot and per serving cell ($C^\mu$) |
|---|---|
| 0 | 56 |
| 1 | 56 |
| 2 | 48 |
| 3 | 32 |

For convenience of explanation, a situation that satisfies both conditions 1 and 2 at a specific time point is defined as "condition A". Accordingly, not satisfying condition A may refer to not satisfying at least one of conditions 1 and 2 above.

According to the configuration of the search space sets of the base station, the condition A may not be satisfied at a specific time point. If condition A is not satisfied at a specific time point, the UE may select and monitor only some of the search space sets configured to satisfy condition A at the corresponding time point, and the base station may transmit the PDCCH to the selected search space set.

The following method may be followed as a method of selecting some search spaces from among the entire set of search spaces.

When condition A for PDCCH is not satisfied at a specific time point (slot),

The UE (or the base station) may preferentially select a search space set in which a search space type is configured as a common search space from among search space sets existing at a corresponding time, over a search space set configured as a UE-specific search space.

When all search space sets configured as the common search space are selected (that is, if condition A is satisfied even after selecting all search spaces set as common search spaces), the UE (or the base station) may select search space sets configured as the UE-specific search space. In this case, when there are a plurality of search space sets configured as the UE-specific search space, a search space set having a low search space set Index may have a higher priority. The UE (or the base station) may select the UE-specific search space sets within a range in which condition A is satisfied in consideration of priority.

In 5G, the CORESET may be composed of $N_{RB}^{CORESET}$ RBs in the frequency domain and may be composed of $N_{symb}^{CORESET} \in \{1,2,3\}$ symbols in the time axis. One CCE may consist of 6 REGs, and a REG may be defined as 1 RB for 1 OFDM symbol. In one CORESET, REGs may be Indexed in a time-first order, starting with REG Index 0 from the first OFDM symbol of the CORESET, the lowest RB.

In 5G, an interleaved method and a non-interleaved method are supported as transmission methods for the PDCCH. The base station may configure whether to transmit interleaving or non-interleaving for each CORESET to the UE through higher layer signaling. Interleaving may be performed in units of REG bundles. A REG bundle may be defined as a set of one or a plurality of REGs. The UE may determine the CCE-to-REG mapping method in the corresponding CORESET in the following manner, shown below in Table 15, based on whether interleaving or non-interleaving transmission configured from the base station is performed.

TABLE 15

The CCE-to-REG mapping for a control-resource set can be interleaved or non-interleaved and is described by REG bundles:
- REG bundle i is defined as REGs {iL,iL+1,...,iL+L−1} where L is the REG bundle size, i = 0,1, ..., $N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles {f(6j/L),f(6j/L+1),..., f(6j/L+6/L−1)} where f(−) is an interleaver For non-interleaved CCE-to-REG mapping, L = 6 and f(x) = x.
For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by $f(x) = (rC + c + n_{shift}) \mod (N_{REG}^{CORESET}/L)$
$x = cR + r$
$r = 0,1, \ldots, R - 1$
$c = 0,1, \ldots, C - 1$
$C = N_{REG}^{CORESET}/(LR)$ where $R \in \{2,3,6\}$.

Hereinafter, a rate matching operation and a puncturing operation will be described in detail.

When the time and frequency resource A to transmit the arbitrary symbol sequence A overlaps the arbitrary time and frequency resource B, a rate matching or a puncturing operation may be considered as the transmission/reception operation of the channel A in consideration of the resource C in the region where the resource A and the resource B overlap. The specific operation may follow the following contents.

Rate Matching Operation

The base station may map and transmit the channel A only for the remaining resource regions except for the resource C corresponding to the region overlapping the resource B among all the resources A to which the symbol sequence A is to be transmitted to the UE. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the base station may sequentially map the symbol sequence A to {resource #1, resource #2, and resource #4}, which is the remaining resource except for {resource #3} corresponding to resource C, from among resource A, and may transmit the symbol sequence A. As a result, the base station may map and transmit the symbol sequence {symbol #1, symbol #2, and symbol #3} to {resource #1, resource #2, and resource #4}, respectively.

The UE may determine the resource A and the resource B from the scheduling information for the symbol sequence A from the base station, and through this, the UE may determine the resource C, which is an area where the resource A and the resource B overlap. The UE may receive the symbol sequence A, assuming that the symbol sequence A is mapped and transmitted in the remaining region except for the resource C among all the resources A. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the UE may receive, assuming that the symbol sequence A is sequentially mapped to {resource #1, resource #2, resource #4}, which are the remaining resources except for {resource #3} corresponding to resource C among resource A. As a result, the UE may assume that the symbol sequence {symbol #1, symbol #2, symbol #3} is mapped to {resource #1, resource #2, resource #4} and transmitted, and may perform a subsequent series of reception operations.

Puncturing Operation

When there is a resource C corresponding to an area overlapping with the resource B among all the resources A for transmitting the symbol sequence A to the UE, the base station may map the symbol sequence A to the entire resource A, but may not perform transmission in the resource region corresponding to the resource C, and may perform transmission only in the remaining resource regions except for the resource C among the resources A. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the base station may map the symbol sequence A {symbol #1, symbol #2, symbol #3, symbol #4} to resource A {resource #1, resource #2, resource #3, resource #4}, respectively, may transmit only the symbol sequence {symbol #1, symbol #2, symbol #4} corresponding to {resource #1, resource #2, resource #4}, which is the remaining resources except for {resource #3} corresponding to resource C, among resource A, and may not transmit {symbol #3} mapped to {resource #3} corresponding to resource C. As a result, the base station may map and transmit the symbol sequence {symbol #1, symbol #2, and symbol #4} to {resource #1, resource #2, and resource #4}, respectively.

The UE may determine the resource A and the resource B from the scheduling information for the symbol sequence A from the base station, and through this, may determine the resource C, which is an area where the resource A and the resource B overlap. The UE may receive the symbol sequence A, assuming that the symbol sequence A is mapped and transmitted in the remaining region except for the resource C among all the resources A. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the UE may assume that the symbol sequence A {Symbol #1, Symbol #2, Symbol #3, and Symbol #4} is each mapped to the resource A {resource #1, resource #2, resource #3, and resource #4}, but the {symbol #3} mapped to the {resource #3} corresponding to the resource C is not transmitted, and may receive assuming that the symbol sequence {symbol #1, symbol #2, and symbol #4} corresponding to {resource #1, resource #2, resource #4}, which is the remaining resource except for {resource #3} corresponding to resource C, is mapped and transmitted from among resource A. As a result, the UE may assume that the symbol sequence {symbol #1, symbol #2, symbol #3} is mapped to {resource #1, resource #2, resource #4} and transmitted, and may perform a subsequent series of reception operations.

Hereinafter, a method of configuring a rate matching resource for the purpose of rate matching in a 5G communication system will be described. Rate matching refers to the size of the signal being adjusted in consideration of the amount of resources capable of transmitting the signal. For example, the rate matching of the data channel may refer to the size of data being adjusted accordingly without mapping and transmitting the data channel for a specific time and frequency resource region.

Figure 6:
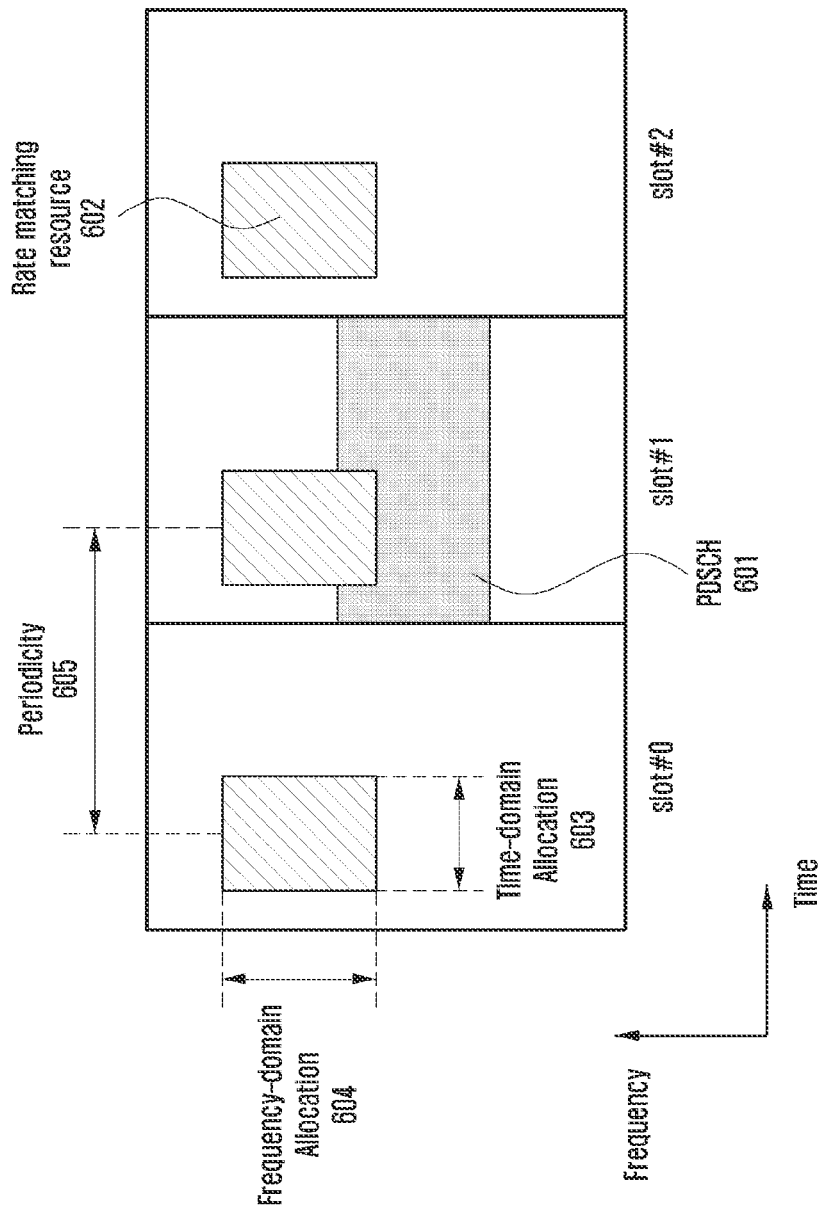
FIG. 6 is a diagram for illustrating a method for a base station and a UE to transmit and receive data in consideration of a downlink data channel and a rate matching resource, according to an embodiment.

FIG. 6 is a diagram for illustrating a method for a base station and a UE to transmit and receive data in consideration of a downlink data channel and a rate matching resource, according to an embodiment.

Referring to FIG. 6, a PDSCH 601 and a rate matching resource 602 are illustrated. The base station may configure a rate matching resource 602 through higher layer signaling (e.g., RRC signaling) to the UE. The rate matching resource 602 configuration information may include time-domain resource allocation information 603, frequency-domain resource allocation information 604, and period information 605. A bitmap corresponding to the frequency domain resource allocation information 604 may be called a "first bitmap", a bitmap corresponding to the time-domain resource allocation information 603 may be called a "second bitmap", and a bitmap corresponding to the period information 605 may be called "third bitmap". When all or part of the time and frequency resources of the scheduled data channel 601 overlap with the set rate matching resource 602, the base station may rate-match and transmit the data channel 601 in the rate matching resource 602 part, and the UE may perform reception and decoding after assuming that the data channel 601 is rate matched in the rate matching resource 602 part.

The base station may dynamically notify the UE, through DCI, whether or not to rate-match the data channel in the configured rate matching resource part through additional configuration (corresponding to the "rate matching indicator" in the DCI format described above). Specifically, the base station may select some of the configured rate matching resources and group them into a rate matching resource group, and may indicate the UE whether to rate match the data channel for each rate matching resource group by DCI using a bitmap method. For example, when four rate matching resources, RMR #1, RMR #2, RMR #3, and RMR #4 are configured, the base station may configure RMG #1={RMR #1, RMR #2} and RMG #2={RMR #3, RMR #4} as rate matching groups, and may indicate to the UE whether the rate is matched in RMG #1 and RMG #2, respectively, with a bitmap using 2 bits in the DCI field. For example, when rate matching is to be performed, "1" may be indicated, and when rate matching is not to be performed, "0" may be indicated.

5G supports the granularity of "RB symbol level" and "RE level" as a method of configuring the above-described rate matching resource to the UE. More specifically, the following configuration method may be followed.

RB Symbol Level

The UE may receive up to four RateMatchPatterns for each BWP configured through higher layer signaling, and one RateMatchPattern may include the following content.

As a reserved resource in the BWP, a resource in which a time and frequency resource region of the corresponding reserved resource is configured as a combination of an RB-level bitmap and a symbol-level bitmap on the frequency axis may be included. The reserved resource may span one or two slots. A time domain pattern (periodicityAndPattern) in which the time and frequency domains composed of each RB level and symbol level bitmap pair are repeated may be additionally configured.

A time and frequency domain resource region configured as a CORESET in the BWP and a resource region corresponding to a time domain pattern configured as a search space configuration in which the resource region is repeated may be included.

RE Level

The UE may receive the following contents configured through higher layer signaling.

As configuration information (lte-CRS-ToMatchAround) for the RE corresponding to the LTE CRS pattern, the number of ports of LTE CRS (nrofCRS-Ports) and LTE-CRS-vshift(s) value (v-shift), center subcarrier location information (carrierFreqDL) of LTE carrier from the reference frequency point (e.g., reference point A), bandwidth size (carrierBandwidthDL) information of an LTE carrier, and subframe configuration information (mbsfn-SubframConfigList) corresponding to multicast-broadcast single-frequency network (MBSFN) may be included. The UE may determine the location of the CRS in the NR slot corresponding to the LTE subframe based on the above-described information.

Configuration information for a resource set corresponding to one or more ZP CSI-RSs in the BWP may be included.

Next, the rate match procedure for the above-described LTE CRS will be described in detail. For the coexistence of LTE and NR (LTE-NR Coexistence), NR provides a function of configurating a CRS pattern of LTE to an NR UE. More specifically, the CRS pattern may be provided by RRC signaling including at least one parameter in ServingCellConfig information element (IE) or ServingCellConfigCommon IE. Examples of the parameter may include lte-CRS-ToMatchAround, lte-CRS-PatternList1-r16, lte-CRS-PatternList2-r16, and crs-RateMatch-PerCORESETPoolIndex-r16.

Rel-15 NR provides a function in which one CRS pattern can be configured per serving cell through the lte-CRS-ToMatchAround parameter. In Rel-16 NR, the above function has been extended to enable configuration of a plurality of CRS patterns per serving cell. More specifically, one CRS pattern per one LTE carrier may be configured in a single-TRP (transmission and reception point) configured UE, one CRS pattern per one LTE carrier may be configured in the multi-TRP configured UE, and two CRS patterns may be configured per one LTE carrier. For example, in the single-TRP configured UE, up to three CRS patterns per serving cell may be configured through the lte-CRS-PatternList1-r16 parameter. Additionally or alternatively, a CRS may be configured for each TRP in the multi-TRP configured UE. That is, the CRS pattern for TRP1 may be configured through the lte-CRS-PatternList1-r16 parameter, and the CRS pattern for TRP2 may be configured through the lte-CRS-PatternList2-r16 parameter. On the other hand, when two TRPs are configured as described above, whether to apply both the CRS patterns of TRP1 and TRP2 to a specific PDSCH or whether to apply only the CRS pattern of one TRP is determined through the crs-RateMatch-PerCORESETPoolIndex-r16 parameter, and if the crs-RateMatch-PerCORESETPoolIndex-r16 parameter is configured to enabled, only one TRP CRS pattern is applied, and in other cases, both TRP CRS patterns are applied.

Table 16, below, illustrates the ServingCellConfig IE including the CRS pattern, and Table 17, below, illustrates the RateMatchPatternLTE-CRS IE including at least one parameter for the CRS pattern.

TABLE 16

ServingCellConfig IE

```
ServingCellConfig ::=           SEQUENCE {
    tdd-UL-DL-ConfigurationDedicated                    TDD-UL-DL-ConfigDedicated
OPTIONAL, -- Cond TDD
    initialDownlinkBWP                                  BWP-DownlinkDedicated
OPTIONAL, -- Need M
    downlinkBWP-ToReleaseList           SEQUENCE (SIZE (1..maxNrofBWPs)) OF BWP-Id
OPTIONAL, -- Need N
    downlinkBWP-ToAddModList            SEQUENCE (SIZE (1..maxNrofBWPs)) OF BWP-Downlink
OPTIONAL, -- Need N
    firstActiveDownlinkBWP-Id       BWP-Id                                          OPTIONAL,
-- Cond SyncAndCellAdd
    bwp-InactivityTimer             ENUMERATED {ms2, ms3, ms4, ms5, ms6, ms8, ms10, ms20, ms30,
                                        ms40,ms50, ms60, ms80,ms100, m200,ms300, ms500,
                                        ms750, ms1280, ms1920, ms2560, spare10, spare9, spare8,
                                        spare7, spare6, spare5, spare4, spare3, spare2, spare1}   OPTIONAL, --
Need R
    defaultDownlinkBWP-Id           BWP-Id                                          OPTIONAL,
-- Need S
    uplinkConfig                    UplinkConfig                                    OPTIONAL, -
- Need M
    supplementaryUplink             UplinkConfig                                    OPTIONAL,
-- Need M
    pdcch-ServingCellConfig                             SetupRelease { PDCCH-ServingCellConfig }
OPTIONAL, -- Need M
    pdsch-ServingCellConfig                             SetupRelease { PDSCH-ServingCellConfig }
OPTIONAL, -- Need M
    csi-MeasConfig                  SetupRelease { CSI-MeasConfig }                 OPTIONAL,
-- Need M
    sCellDeactivationTimer          ENUMERATED {ms20, ms40, ms80, ms160, ms200, ms240,
                                        ms320, ms400, ms480, ms520, ms640, ms720,
                                        ms840, ms1280, spare2,spare1}  OPTIONAL,            -- Cond
ServingCellWithoutPUCCH
    crossCarrierSchedulingConfig    CrossCarrierSchedulingConfig                    OPTIONAL,
-- Need M
    tag-Id                          TAG-Id,
    dummy                                               ENUMERATED            {enabled}
OPTIONAL, -- Need R
    pathlossReferenceLinking                            ENUMERATED    {spCELL, sCell}
OPTIONAL, -- Cond SCellOnly
    servingCellMO                   MeasObjectId                                    OPTIONAL,
-- Cond MEasObject
    ...,
    [[
    lte-CRS-ToMatchAround                               SetupRelease{ RateMatchPatternLTE-CRS }
OPTIONAL, -- Need M
    rateMatchPatternToAddModList        SEQUENCE (SIZE (1..maxNrofRateMatchPatterns)) OF RateMatchPattern
OPTIONAL, -- Need N
    rateMatchPatternToReleaseList       SEQUENCE (SIZE (1..maxNrofRateMatchPatterns)) OF RateMatchPatternId
OPTIONAL, -- Need N
    downlinkChannelBW-PerSCS-List       SEQUENCE (SIZE (1..maxSCSs)) OF SCS-Specific Carrier
OPTIONAL -- Need S
    ]],
    [[
    supplementaryUplinkRelease                          ENUMERATED            {true}
OPTIONAL, -- Need N
    tdd-UL-DL-ConfigurationDedicated-IAB-MT-r16         TDD-UL-DL-ConfigDedicated-IAB-MT-r16
OPTIONAL, -- Cond TDD_IAB
    dormantBWP-Config-r16                               SetupRelease { DormantBWP-Config-r16 }
OPTIONAL, -- Need M
    ca-SlotOffset-r16               CHOICE{
        refSCS15kHz                     INTEGER (-2..2),
        refSCS30KHz                     INTEGER (-5..5),
        refSCS60KHz                     INTEGER (-10..10),
        refSCS120KHz                    INTEGER (-20..20)
    }                                                                               OPTIONAL, --
Cond AsyncCA
    channelAccessConfig-r16         SetupRelease { ChannelAccessConfig-r16 }        OPTIONAL,
-- Need M
    intraCellGuardBandsDL-List-r16      SEQUENCE (SIZE (1..maxSCSs)) OF IntraCellGuardBandsPerSCS-r16
OPTIONAL, -- Need S
    intraCellGuardBandsUL-List-r16      SEQUENCE (SIZE (1..maxSCSs)) OF IntraCellGuardBandsPerSCS-r16
OPTIONAL, -- Need S
    csi-RS-ValidationWith-DCI-r16                       ENUMERATED            {enabled}
OPTIONAL, -- Need R
    lte-CRS-PatternList-r16         SetupRelease { LTE-CRS-PatternList-r16 }        OPTIONAL,
-- Need M
    lte-CRS-PatternList-r16         SetupRelease { LTE-CRS-PatternList-r16 }        OPTIONAL,
-- Need M
```

TABLE 16-continued

| ServingCellConfig IE | | |
|---|---|---|
| crs-RateMatch-PerCORESETPoolIndex-r16 OPTIONAL, -- Need R | ENUMERATED | {enabled} |
| enableTwoDefaultTCI-States-r16 OPTIONAL, -- Need R | ENUMERATED | {enabled} |
| enableDefaultTCI-StatePerCoresetPoolIndex-r16 OPTIONAL, -- Need R | ENUMERATED | {enabled} |
| enableBeamSwitchTiming-r16 OPTIONAL, -- Need R | ENUMERATED | {true} |
| cbg-TxDiffTBsProcessingType1-r16 OPTIONAL, -- Need R | ENUMERATED | {enabled} |
| cbg-TxDiffTBsProcessingType2-r16 OPTIONAL -- Need R ]] } | ENUMERATED | {enabled} |

TABLE 17

| RateMatchPatternLTE-CRS IE |
|---|
| - RateMatchPatternLTE-CRS<br>The IE RateMatchPatternLTE-CRS is used to configure a pattern to rate match around LTE CRS. See TS 38.214 [19], clause 5.1.4.2. |
| RateMatchPatternLTE-CRS information element |
| -- ASN1START<br>-- TAG-RATEMATCHPATTERNLTE-CRS-START<br>RateMatchPatternLTE-CRS ::=    SEQUENCE {<br>  carrierFreqDL               INTEGER (0..16383),<br>  carrierBandwidthDL        ENUMERATED {n6, n15, n25, n50, n75, n100, spare2, spare1},<br>  mbsfn-SubframeConfigList     EUTRA-MBSFN-SubframeConfigList<br>OPTIONAL, -- Need M<br>  nrofCRS-Ports             ENUMERATED {n1, n2, n4},<br>  v-Shift                    ENUMERATED {n0, n1, n2, n3, n4, n5}<br>}<br>LTE-CRS-PatternList-r16 ::=    SEQUENCE (SIZE (1..maxLTE-CRS-Patterns-r16)) OF RateMatchPatternLTE-CRS<br>-- TAG-RATEMATCHPATTERNLTE-CRS-STOP<br>-- ASN1STOP |
| RateMatchPatternLTE-CRS field descriptions |
| carrierBandwidthDL<br>BW of the LTE carrier in number of PRBs (see TS 38.214 [19], clause 5.1.4.2).<br>carrierFreqDL<br>Center of the LTE carrier (see TS 38.214 [19], clause 5.1.4.2)<br>mbsfn-SubframeConfigList<br>LTE MBSFN subframe configuration (see TS 38.214 [19], clause 5.1.4.2).<br>nrofCRS-Ports<br>Number of LTE CRS antenna port to rate-match around (see TS 38.214 [10], clause 5.1.4.2).<br>v-Shift<br>Shifting value v-shift in LTE to rate match around LTE CRS (see TS 38.214 [19], clause 5.1.4.2). |

As described above, only one CRS pattern per one LTE carrier may be configured in the single-TRP configured UE. Therefore, in a multi-cell environment, when the neighboring LTE cell(s) uses a different CRS pattern from the serving cell (LTE-NR coexistence cell) of the UE, the UE may receive significant interference from the neighboring LTE cell(s). In the above problem, interference to the UE can be reduced through proper scheduling of the base station, but scheduling is performed in units of RBs and CRS is mapped in units of REs, so there is a limit. Hereinafter, the disclosure proposes a method for minimizing interference from neighboring LTE cell(s) in the multi-cell environment as described above.

"Embodiment 1" may refer to an embodiment of configuring a plurality of CRS pattern information for neighboring LTE cell(s).

The NR base station may configure the CRS pattern information of the neighboring LTE cell(s) to the NR UE.

The NR base station may additionally configure CRS pattern information for the neighboring LTE cell(s) in addition to the CRS pattern information for the serving cell (an LTE-NR coexistence cell) to the NR UE CRS pattern information configured by the NR base station to the NR UE may include CRS pattern information of a serving cell (an LTE-NR coexistence cell) and neighboring LTE cell(s).

The CRS pattern information may include an indicator as to whether the corresponding CRS pattern is for a serving cell or a neighboring LTE cell. Alternatively, an indicator indicating whether the corresponding CRS pattern is for rate-matching or interference cancellation may be included.

The configuration information may be transmitted from the NR base station to the NR UE through higher layer signaling (e.g., RRC signaling).

The NR base station may receive, from the neighboring base station(s), CRS pattern related information (for example, LTE Cell ID, the number of CRS transmission ports, $v_{shift}$, and/or transmission power) of each LTE serving cell(s) of the neighboring base station(s). The NR base station may select at least one of the LTE serving cell(s) and may generate CRS pattern(s) information to be configured in the UE based on CRS pattern related information of the selected LTE serving cell(s). In the process of selecting at least one of the LTE serving cell(s), the LTE serving cell(s) having a large transmission power may be preferentially selected. The NR base station may transmit the generated information to the NR UE to configure a CRS pattern for the LTE cell(s) adjacent to the NR UE.

The NR base station may receive, from the UE (for example, a UE supporting both LTE and NR), information (for example, LTE Cell ID, the number of CRS transmission ports, $v_{shift}$, and/or reception power) on neighboring LTE serving cell(s) of the UE existing in the same frequency band as the serving cell configured in the UE. The NR base station may select at least one of the LTE serving cell(s), and may generate CRS pattern(s) information to be configured in the UE based on CRS pattern related information of the selected LTE serving cell(s). In the process of selecting at least one of the LTE serving cell(s), the LTE serving cell(s) having a large reception power may be preferentially selected. The NR base station may transmit the generated information to the UE to configure a CRS pattern for the LTE cell(s) adjacent to the UE.

The NR UE may receive at least one CRS pattern information(s) for the serving cell (an LTE-NR coexistence cell) and the neighboring LTE cell(s), and may de-map the PDSCH by rate matching, that is a method in which PDSCH is not mapped to specific REs to which CRS(s) are mapped based on the CRS pattern information, based on at least the at least one received CRS pattern information.

The NR UE may receive at least one CRS pattern information(s) for the serving cell (an LTE-NR coexistence cell) and the neighboring LTE cell(s), and may de-map the PDSCH by interference cancellation, that is a method in which PDSCH is mapped to specific REs to which CRS(s) are mapped based on the CRS pattern information, based on the at least one received CRS pattern information.

The NR UE may receive at least one CRS pattern information(s) for the serving cell (an LTE-NR coexistence cell) and the neighboring LTE cell(s), and may de-map the received PDSCH in such a way that rate matching is performed based on the CRS pattern information of the serving cell (LTE-NR coexistence cell) and may de-map the received PDSCH in such a way that interference cancellation is performed based on the CRS pattern information of the neighboring LTE cell(s).

The NR base station may generate and transmit CRS pattern information for the serving cell (LTE-NR coexistence cell) and neighboring LTE cell(s) to the UE through higher layer signaling (for example, RRC signaling), may determine RE(s) to which CRS(s) can be mapped through the CRS pattern information, may determine whether to map the PDSCH to the RE(s), and may map and transmit the PDSCH to the UE according to the decision.

Among the RE(s), the NR base station may determine whether the PDSCH is mapped in a rate matching method for the RE(s) to which the CRS used in the LTE carrier of the serving cell (LTE-NR coexistence cell) is mapped, and in an interference cancellation method for the RE(s) to which CRS used in the neighboring LTE cell(s) is mapped.

According to a disclosure, among the RE(s), the NR base station may determine whether the PDSCH is mapped in a rate matching method for the RE(s) to which the CRS used in the LTE carrier of the serving cell (LTE-NR coexistence cell) is mapped and RE(s) to which CRSs used in neighboring LTE cell(s) are mapped are utilized for interference cancellation and may not be involved in PDSCH mapping. In other words, the PDSCH is not mapped to RE(s) to which the CRS used in the LTE carrier of the serving cell (LTE-NR coexistence cell) is mapped, and the PDSCH may be mapped to the CRS used in the neighboring LTE cell(s).

Figure 7A:
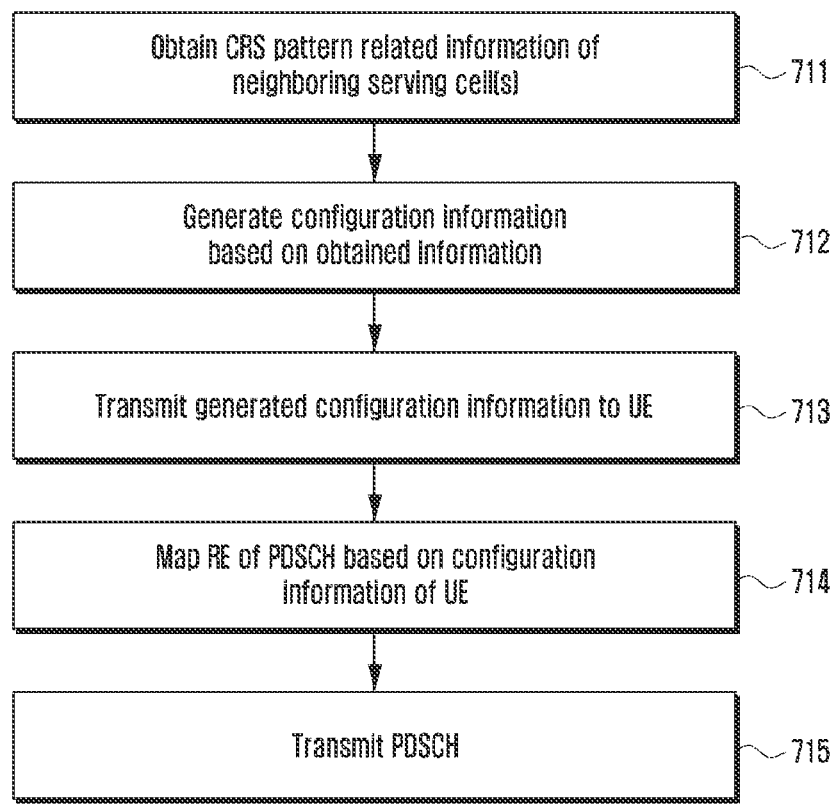
FIG. 7A is a diagram for illustrating an example of an operation of a base station in a wireless communication system, according to an embodiment.

FIG. 7A is a diagram for illustrating an operation of an NR base station, according to an embodiment.

Referring to FIG. 7A, the NR base station obtains CRS pattern related information of the neighboring serving cell(s) in step 711, generates configuration information based on the obtained information in step 712, and transmits the generated configuration information to the UE in step 713. The NR base station performs RE mapping of the PDSCH to the UE based on the configuration information in step 714 and transmits the PDSCH in step 715.

Figure 7B:
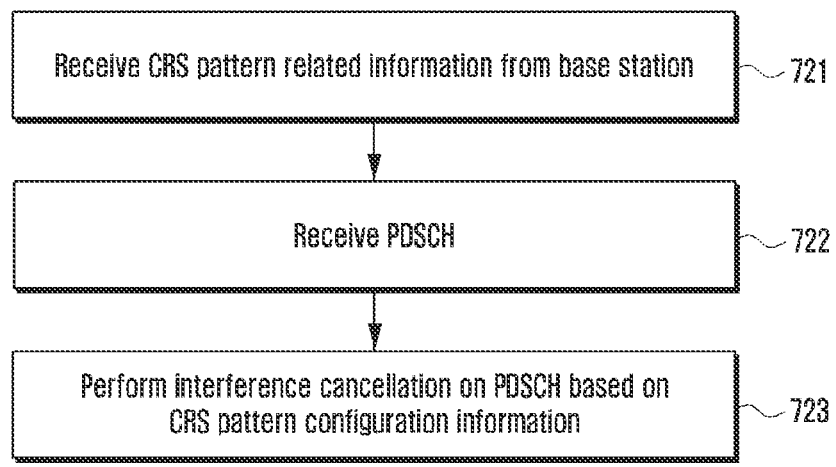
FIG. 7B is a diagram for illustrating an example of an operation of a UE in a wireless communication system, according to an embodiment.

FIG. 7B is a diagram for illustrating an operation of an NR UE, according to an embodiment.

Referring to FIG. 7B, the NR UE receives CRS pattern related configuration information from the base station in step 721. Subsequently, the UE receives the PDSCH transmitted from the base station in step 722, and selectively performs an interference cancellation operation based on the received CRS pattern configuration information in step 723. For example, an interference cancellation operation may be performed for specific RE(s).

"Embodiment 2" may refer to an embodiment that includes an interference cancellation method.

Information on one neighboring LTE cell among the information on the CRS pattern information of the neighboring LTE cell(s) transmitted by the NR base station of embodiment 1 to the NR UE may include at least a part of the list shown below in Table 18.

TABLE 18

Neighboring LTE Cell Information (1)

- Bandwidth of LTE carrier (carrierBandwidthDL) of neighboring LTE cell
- Frequency band of LTE carrier (carrierFreqDL) of neighboring LTE cell
- MBSFN subframe configuration (mbsfn-SubframeConfigList) of neighboring LTE cell
- Number of CRS antenna port (nrofCRS-Ports) of neighboring LTE cell
- $v_{shift}$ (v-Shift) of neighboring LTE cell
- Cell ID of neighboring LTE cell
- cyclic prefix type (whether normal CP or extended CP) of neighboring LTE cell Information on one neighboring LTE cell among the information on the CRS pattern information of the neighboring LTE cell(s) transmitted by the NR base station of embodiment 1 to the NR UE may include at least a part of the list shown below in Table 19. The NR UE may obtain a $v_{shift}$ (v-Shift) value through a "mod 6" calculation on a cell ID value of a neighboring LTE cell.

TABLE 19

Neighboring LTE Cell Information (2)

- Bandwidth of LTE carrier (carrierBandwidthDL) of neighboring LTE cell
- Frequency band of LTE carrier (carrierFreqDL) of neighboring LTE cell
- MBSFN subframe configuration (mbsfn-SubframeConfigList) of neighboring LTE cell
- Number of CRS antenna port (nrofCRS-Ports) of neighboring LTE cell
- ~~$v_{shift}$ (v-Shift) of neighboring LTE cell~~
- Cell ID of neighboring LTE cell
- cyclic prefix type (whether normal CP or extended CP) of neighboring LTE cell Information on one neighboring LTE cell among the information on the CRS pattern information of the neighboring LTE cell(s) transmitted by the NR base station of embodiment 1 to the NR UE may include at least a part of the list shown below in Table 20. The NR UE may assume that the cell ID of the neighboring LTE cell is the same as the cell ID of the NR cell, and the cyclic prefix of the neighboring LTE cell is a normal CP.

TABLE 20

Neighboring LTE Cell Information (3)

- Bandwidth of LTE carrier (carrierBandwidthDL) of neighboring LTE cell
- Frequency band of LTE carrier (carrierfreqDL) of neighboring LTE cell
- MBSFN subframe configuration (mbsfn-SubframeConfigList) of neighboring LTE cell
- Number of CRS antenna port (nrofCRS-Ports) of neighboring LTE cell
- $v_{shift}$ (v-Shift) of neighboring LTE cell Assuming that the "LTE radio frame boundary" and the "NR radio frame boundary" of the serving cell (LTE-NR coexistence cell) are aligned, the NR UE may determine the "slot Index in the LTE radio frame and the OFDM symbol Index in the slot". Alternatively, if not aligned, the base station may signal the offset (the offset is, for example, a value per NR slot or a value per LTE slot) to the UE, and the UE may determine a "slot Index in an LTE radio frame and an OFDM symbol Index in a slot" based on the signaling. Alternatively, the base station may signal whether aligned, and when not aligned, the offset (the offset is, for example, a value in units of NR slots or values in units of LTE slots) may be additionally signaled. Alternatively, if the offset is not signaled, the NR UE may operate assuming that the "LTE radio frame boundary" and the "NR radio frame boundary" of the serving cell (LTE-NR coexistence cell) are aligned.

Information on one neighboring LTE cell among the information on the CRS pattern information of the neighboring LTE cell(s) transmitted by the NR base station of embodiment 1 to the NR UE may include at least a part of the list in Table 21.

TABLE 21

Neighboring LTE Cell Information (4)

- Bandwidth of LTE carrier (carrierBandwidthDL) of neighboring LTE cell
- Frequency band of LTE carrier (carrierFreqDL) of neighboring LTE cell
- MBSFN subframe configuration (mbsfn-SubframeConfigList) of neighboring LTE cell
- Number of CRS antenna port (nrofCRS-Ports) of neighboring LTE cell
- $v_{shift}$ (v-Shift) of neighboring LTE cell
- Cell ID of neighboring LTE cell
- cyclic prefix type (whether normal CP or extended CP) of neighboring LTE cell
- Whether 'LTE radio frame boundary' and 'NR radio frame boundary' are aligned
- Difference between 'LTE radio frame boundary' and 'NR radio frame boundary'

As described above, the UE receiving the information on the neighboring LTE cell(s) may generate a sequence(s) of the CRS(s) of the neighboring LTE cell(s) based on the received information and may obtain the mapping information on the time-frequency resource of the CRS. At this time, the sequence of CRS(s) may be generated as follows. In this case, m may be an Index of an RB to which the CRS is mapped. The reference-signal sequence $r_{l,n_s}(m)$ is defined by Equation (3), below.

$$r_{l,n_s}(m) = \frac{1}{\sqrt{2}}(1 - 2 \cdot c(2m)) + j\frac{1}{\sqrt{2}}(1 - 2 \cdot c(2m - 1)),$$ Equation (3)

$$m = 0, 1, \ldots, 2N_{RB}^{max,DL} - 1$$

where $n_s$ is the slot number within a radio frame and l is the OFDM symbol number within the slot. The pseudo-random sequence c(s) is defined in Section 7.2. The pseudo-random sequence generator shall be initialised with $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol where $$N_{CP} = \begin{cases} 1 & \text{for normal } CP \\ 0 & \text{for extended } CP \end{cases}.$$

Based on the CRS sequence and time-frequency resource mapping information of the neighboring LTE cell(s) obtained in the manner(s) described above, it is possible to estimate the channel between the neighboring LTE cell(s) and the UE from the received CRS signal of the neighboring LTE cell(s). Because the received CRS signal may be mixed with the PDSCH transmission signal of the NR cell due to interference at this time, a procedure of processing the interference through a successive interference cancellation (SIC) process may be required. The SIC process may be configured as follows, or may be configured in other ways.

The reception signal of the UE y may be described as shown below in Equation (4):

$$y = h_{NR-UE}x_{PDSCH} + h_{LTE-UE}x_{CRS} + n$$ Equation (4)

where:
- $h_{NR-UE}$ is a channel between the NR cell and the UE, and is a value obtained in advance by the UE through PDSCH DM-RS or the like.
- $x_{PDSCH}$ is data transmitted in the NR cell and is a value unknown to the UE;
- $h_{LTE-UE}$ is a channel between a neighboring LTE cell and a UE and is a value unknown to the UE;
- $x_{CRS}$ is a CRS signal of a neighboring LTE cell and is a value obtained in advance by the UE; and
- n is the noise signal.

Under the assumption that the reception power of $x_{CRS}$ is greater than that of $x_{PDSCH}$, the UE may perform the following three (3) steps.

Step 1. $h_{LTE-UE}$ channel estimation: at this time, because $h_{NR-UE}x_{PDSCH}$ is assumed as interference, the signal to be estimated, that is, the SINR of the channel value, is $$SINR_{LTE-UE} = \frac{P_{CRS}|h_{LTE-UE}|^2}{N_0 + P_{PDSCH}|h_{NR-UE}|^2},$$

and if this value is not too low, the UE may obtain the $h_{LTE-UE}$ value.

Step 2. It is possible to subtract $h_{LTE-UE}x_{CRS}$ from the received signal y. Then, the residual signal is $\tilde{y} = h_{NR-UE}x_{PDSCH} + n$.

Step 3. $x_{PDSCH}$ signal decoding: at this time, the SNR of the signal to be decoded is $$SINR_{LTE-UE} = \frac{P_{CRS}|h_{LTE-UE}|^2}{N_0 + P_{PDSCH}|h_{NR-UE}|^2},$$

and if this value is not too low, the UE may succeed in decoding.

Figure 8:
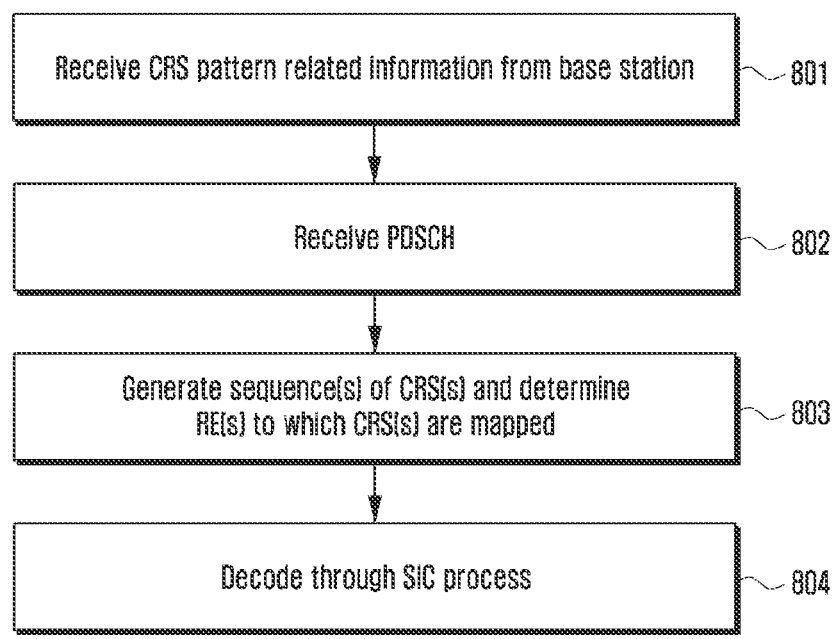
FIG. 8 is a diagram for illustrating an example of an operation of a UE in a wireless communication system, according to an embodiment.

FIG. 8 is a diagram for illustrating an operation of an NR UE, according to an embodiment.

Referring to FIG. 8, the NR UE receives CRS pattern related configuration information from the base station in step 801. Then, the NR UE receives the PDSCH in step 802. In step 803, the NR UE generates sequence(s) of CRS(s) based on the CRS pattern related configuration information obtained in step 801 and determines RE(s) to which CRS(s) are mapped. In addition, the NR UE performs decoding through the SIC process in step 804.

"Embodiment 3" may refer to an embodiment describing interference cancellation/rate match operation classification.

Classification through a capability of a UE will now be described.

UE capability information for interference cancellation as in the first and second embodiments may be defined. The NR UE may receive a "UECapabilityEnquiry" message from the NR base station, and respond to the NR base station including the "UE capability information for interference cancellation". The NR base station may configure a UE capable of interference cancellation to perform interference cancellation, and may configure a UE incapable of interference cancellation to perform rate matching based on the "UE capability information for interference cancellation" responded by the UE.

Figure 9A:
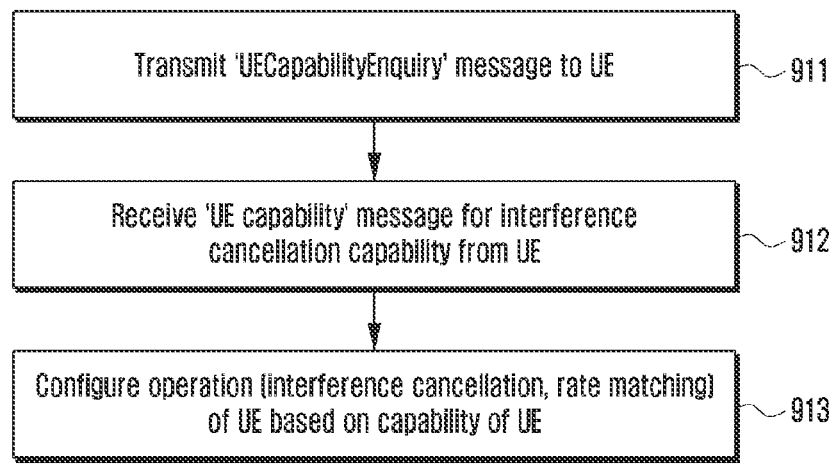
FIG. 9A is a diagram for illustrating an example of an operation of a base station in a wireless communication system, according to an embodiment.

FIG. 9A is a diagram for illustrating an operation of an NR base station, according to an embodiment.

Referring to FIG. 9A, the NR base station transmits a "UECapabilityEnquiry" message to the NR UE in step 911, and receives the "UE capability" message for the interference cancellation capability from the UE in step 912. Based on the UE capability message, the NR base station configures the operation (interference cancellation and rate matching) of the UE in step 913. In addition, the NR base station may generate CRS pattern information of neighboring serving cell(s) and configure the CRS pattern information in the UE.

Figure 9B:
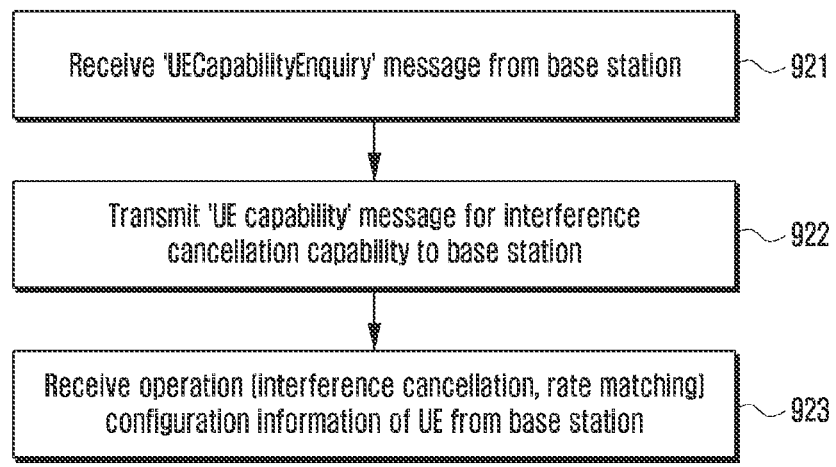
FIG. 9B is a diagram for illustrating an example of an operation of a UE in a wireless communication system, according to an embodiment.

FIG. 9B is a diagram for illustrating an operation of an NR UE, according to an embodiment.

Referring to FIG. 9B, the NR receives a "UECapabilityEnquiry" message from the NR base station in step 921, and transmits a "UE capability" message for the interference cancellation capability to the base station in step 922. In addition, the NR UE receives operation (interference cancellation, rate matching) configuration information of the UE from the base station in step 923, and may operate according to the configuration information. In addition, the NR UE may receive CRS pattern configuration information of neighboring serving cell(s) from the base station.

The NR UE may operate in the conventional manner before receiving the information configuration(s) of the neighboring LTE cell(s) of the first and second embodiments. That is, the operation may be performed assuming that the NR PDSCH is mapped to the RE(s) for transmitting the CRS in the neighboring LTE cell(s). The NR UE may receive the information configuration(s) of neighboring LTE cell(s) of the first and second embodiments. According to the configuration, the NR UE, based on the information configuration(s) of neighboring LTE cell(s), may identify an RE(s) transmitting CRS in a neighboring LTE cell(s), and that the NR PDSCH is not mapped to the identified RE(s), and may perform a rate matching operation. The NR UE may receive the "UECapabilityEnquiry" message from the NR base station, and may respond to the NR base station including the UE capability information for interference cancellation of the first and second embodiments. Thereafter, the UE may operate according to the UE capability information. That is, the UE reporting that interference cancellation is impossible may later identify the RE(s) for transmitting the CRS in the neighboring LTE cell(s) based on the information configuration of the neighboring LTE cell(s), may assume that the NR PDSCH is not mapped to the identified RE(s), and may perform the rate matching operation. On the other hand, the UE reporting that interference cancellation is possible later may identify the RE(s) for transmitting the CRS in the neighboring LTE cell(s) based on the information configuration of the neighboring LTE cell(s), may assume that the NR PDSCH is mapped to the identified RE(s), and may perform the interference cancellation operation according to the first and second embodiments. Table 22, shown below, is an example of a UE operation and illustrates the above description.

TABLE 22

| Time | $T_1$ | $T_2$ | $T_3$ | $T_4$ | $T_5$ |
|---|---|---|---|---|---|
| Event | | Neighboring cell(s) information configuration reception | | UECapabilityEnquiry reception and reporting | |
| Operation | Existing operation | | Rate-matching | | Operation according to capability |

The NR UE may operate in the conventional manner before receiving the information configuration(s) of the neighboring LTE cell(s) of the first and second embodiments. That is, the operation may be performed assuming that the NR PDSCH is mapped to the RE(s) for transmitting the CRS in the neighboring LTE cell(s). The NR UE may receive the information configuration(s) of neighboring LTE cell(s) of the first and second embodiments. According to the configuration, the NR UE, based on the information configuration(s) information of neighboring LTE cell(s), may identify an RE(s) transmitting CRS in a neighboring LTE cell(s), and may assume that the NR PDSCH is not mapped to the identified RE(s), and may perform a rate matching operation. The NR UE may receive the "UECapabilityEnquiry" message from the NR base station, and may respond to the NR base station including the UE capability information for interference cancellation of the first and second embodiments. The NR base station may receive UE capability information for interference cancellation from the UE, and may transmit configuration information for a subsequent operation (that is, whether to perform a rate matching operation or an interference cancellation operation) to the UE. The configuration information may be transmitted to the UE through higher layer signaling (RRC), a MAC CE, or DCI. Thereafter, the UE may operate according to the configuration information of the base station. Table 23, shown below, is an example of a UE operation and illustrates the above description.

TABLE 23

| Time | $T_1$ | $T_2$ | $T_3$ | $T_4$ | $T_5$ | $T_6$ |
|---|---|---|---|---|---|---|
| Event | | Neighboring cell(s) information configuration reception | | UECapabilityEnquiry reception and reporting | Receiving the UE configuration of the base station according to the UE capability | |

TABLE 23-continued

| Time | $T_1$ | $T_2$ | $T_3$ | $T_4$ | $T_5$ | $T_6$ |
|---|---|---|---|---|---|---|
| Operation | Existing operation | | Rate-matching | | | Operation according to configuration of the base station |

Indicating the distinction between the interference cancellation pattern and the rate match pattern will now be described.

CRS pattern information configured by the NR base station to the NR UE may include CRS pattern information of a serving cell (LTE-NR coexistence cell) and neighboring LTE cell(s). The base station may transmit a control signal for at least some of the operations (e.g., rate matching, interference cancellation, and legacy behavior) corresponding to each of the CRS pattern information to the UE. The control signal may be transmitted to the UE through higher layer signaling (RRC), a MAC CE, or DCI. The UE may perform an operation according to a combination of at least one or more of the control signals.

For an RRC based configuration, the NR UE may receive the CRS pattern information of the neighboring LTE cell A and the operation indication (interference cancellation indication) information from the NR base station through higher layer signaling (e.g., RRC signaling). The NR UE receiving the information may perform the interference cancellation operation on the RE(s) to which the CRS of the neighboring LTE cell A is mapped based on the reception control information.

The NR UE may receive the CRS pattern information of the neighboring LTE cell A and the operation indication (rate matching indication) information from the NR base station through higher layer signaling (e.g., RRC signaling). The NR UE receiving the information may perform the rate matching operation on the RE(s) to which the CRS of the neighboring LTE cell A is mapped based on the reception control information.

The NR UE may receive the CRS pattern information of the neighboring LTE cell A from the NR base station through higher layer signaling (e.g., RRC signaling). At this time, the UE may assume that the base station implicitly indicates interference cancellation, and may perform the interference cancellation operation on the RE(s) to which the CRS of the neighboring LTE cell A is mapped based on the reception control information.

The NR UE may receive the CRS pattern information of the neighboring LTE cell A from the NR base station through higher layer signaling (e.g., RRC signaling). At this time, the UE may assume that the base station implicitly indicates interference cancellation, and may perform the rate matching operation on the RE(s) to which the CRS of the neighboring LTE cell A is mapped based on the reception control information.

Unlike the RateMatchPatternLTE-CRS IE of Table 2, the CRS pattern information of a neighboring LTE cell or the list of CRS pattern information of a neighboring LTE cell may be indicated to the UE by a separate IE including at least some of the lists, such as those provided by Tables 18-21.

Figure 10A:
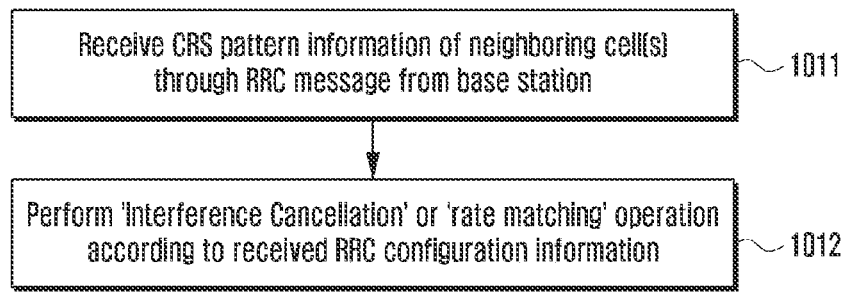
FIG. 10A is a diagram for illustrating an example of an operation of a UE in a wireless communication system, according to an embodiment.

FIG. 10A is a diagram for illustrating an operation of an NR UE, according to an embodiment.

Referring to FIG. 10A, the NR UE receives CRS pattern information of the adjacent cell(s) through the RRC message from the base station in step 1011. Operation indication (interference cancellation or rate matching) information may be additionally included in the RRC configuration message. Alternatively, operation indication (interference cancellation or rate matching) information may be included in a separate RRC configuration message. Additionally, an operation in the case of receiving CRS pattern information of adjacent cell(s) may be implicitly provided. In addition, an operation in the case of receiving CRS pattern information of the neighboring cell(s) may be implicitly provided according to the capability of the UE. The UE performs an interference cancellation or rate matching operation according to the received RRC configuration information in step 1012.

An RRC+L1/L2 based configuration will now be described.

The NR UE may receive the CRS pattern information of the neighboring LTE cell A from the NR base station through higher layer signaling (e.g., RRC signaling). Additionally, the NR UE may receive the operation indication (interference cancellation indication) information from the NR base station through, for example, a MAC CE or DCI. The NR UE receiving the information may perform the interference cancellation operation on the RE(s) to which the CRS of the neighboring LTE cell A is mapped based on the reception control information. Before receiving the operation instruction (interference cancellation instruction) information, the UE may operate under the assumption of rate matching. The above operation indication information may be newly defined in a MAC CE or newly defined in DCI format. When operation indication (interference cancellation indication) information is defined in the DCI format, the size of the field containing the operation indication (interference cancellation indication) information may be based on the number of CRS pattern information of the neighboring LTE cell configured through higher layer signaling. That is, when information of two adjacent cells is received, it may be 2 bits, and when information of three adjacent cells is received, it may be 3 bits. Through this, the base station may indicate the UE to independently process each of the RE(s) to which the CRS of the neighboring LTE cell is mapped.

The NR UE may receive the CRS pattern information of the neighboring LTE cell A from the NR base station through higher layer signaling (e.g., RRC signaling). Additionally, the NR UE may receive operation indication (rate matching indication) information from the NR base station through, for example, a MAC CE or DCI. The NR UE receiving the information may perform the rate matching operation on the RE(s) to which the CRS of the neighboring LTE cell A is mapped based on the reception control information. Before receiving the operation instruction (rate matching indication) information, the UE may operate under the assumption of rate matching. The above operation indication information may be newly defined in a MAC CE or newly defined in DCI format. When operation indication (rate matching indication) information is defined in the DCI format, the size of the field containing the operation indication (rate matching indication) information may be based on the number of CRS pattern information of the neighboring LTE cell configured through higher layer signaling. That is, when information of two adjacent cells is received, it may be 2 bits, and when information of three adjacent cells is received, it may be 3 bits. Through this, the base station may indicate the UE to independently process each of the RE(s) to which the CRS of the neighboring LTE cell is mapped.

The NR UE may receive the CRS pattern information of the neighboring LTE cell A from the NR base station through higher layer signaling (e.g., RRC signaling). Additionally, the NR UE may receive operation indication (interference cancellation and rate matching) information (1 bit) from the NR base station through, for example, a MAC CE or DCI. The NR UE receiving the information may perform the interference cancellation or rate matching operation on the RE(s) to which the CRS of the neighboring LTE cell A is mapped based on the reception control information. Before receiving the operation instruction (rate matching instruction) information, the UE may operate under the assumption of rate matching. The above operation indication information may be newly defined in a MAC CE or newly defined in a DCI format. When operation indication (interference cancellation and rate matching) information is defined in the DCI format, the size of the field containing the operation indication (interference cancellation and rate matching) information may be based on the number of CRS pattern information of the neighboring LTE cell configured through higher layer signaling. That is, when information of two adjacent cells is received, it may be 2 bits, and when information of three adjacent cells is received, it may be 3 bits. Through this, the base station may indicate the UE to independently process each of the RE(s) to which the CRS of the neighboring LTE cell is mapped.

The NR UE may receive the CRS pattern information of the neighboring LTE cell A from the NR base station through higher layer signaling (e.g., RRC signaling). Additionally, the NR UE may receive operation indication (interference cancellation and rate matching) information from the NR base station through DCI. The operation indication information may be indicated through values of at least some field(s) among field(s) already existing in the DCI format. For example, the value of the modulation and coding scheme field in the DCI format may be used. Assuming that the range of the value of the field is 0 to 31, when a value lower than the specific value is indicated to the UE through the DCI format, the UE may understand this as an indication of interference cancellation and operate, and when a value higher than or equal to the specific value is indicated to the UE through the DCI format, the UE may understand this as an indication of rate matching and operate. Conversely, when a value lower than the specific value is indicated to the UE through the DCI format, the UE may understand this as an indication of rate matching and operate, and when a value higher than or equal to the specific value is indicated to the UE through the DCI format, the UE may understand this as an indication of interference cancellation and operate. At this time, the NR UE may process all of the configured RE(s) to which CRS of all neighboring LTE cell(s) are mapped in the same way (i.e., all interference cancellation or all rate matching). The specific value may be predefined (i.e., stored in advance in the UE) through an NR standard document or transmitted to the UE through control information (e.g., an RRC setting) configured by the NR base station to the UE.

The NR UE may receive the CRS pattern information of the neighboring LTE cell A from the NR base station through higher layer signaling (e.g., RRC signaling). Additionally, the NR UE may receive operation indication (interference cancellation and rate matching) information from the NR base station through DCI. The operation indication information may be indicated through values of at least some field(s) among field(s) already existing in the DCI format.

For example, the value of the DMRS sequence initialization field in the DCI format may be used. When 0 is indicated as the field value, the UE may understand and operate as the PDSCH DMRS sequence initialization value corresponding to the field value is configured and also rate matching for CRS is indicated. Meanwhile, when 1 is indicated as the field value, the UE may understand and operate as the PDSCH DMRS sequence initialization value corresponding to the field value is configured and also interference control for CRS is indicated (or vice versa). At this time, the NR UE may process all of the configured RE(s) to which CRS of all neighboring LTE cell(s) are mapped in the same way (i.e., all interference cancellation or all rate matching). The mapping between DMRS sequence initialization field value and rate matching or interference control operation for CRS may be predefined (i.e., stored in advance in the UE) through an NR standard document or transmitted to the UE through control information (e.g., an RRC setting) configured by the NR base station to the UE.

Figure 10B:
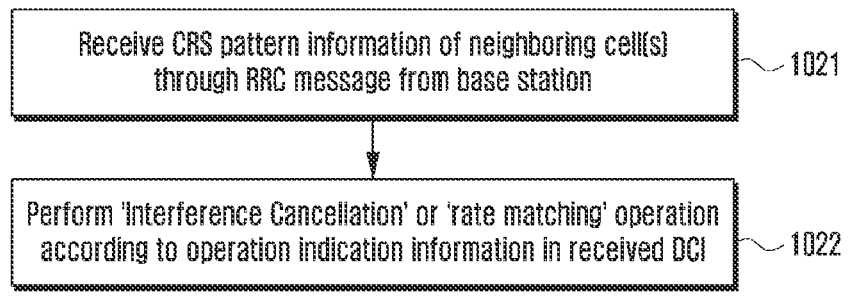
FIG. 10B is a diagram for illustrating an example of an operation of a UE in a wireless communication system, according to an embodiment.

FIG. 10B is a diagram for illustrating an operation of an NR UE, according to an embodiment.

Referring to FIG. 10B, the NR UE receives CRS pattern information of the adjacent cell(s) through the RRC message from the base station in step 1021. The NR UE receives the DCI from the base station and performs interference cancellation or a rate matching operation according to operation indication information included in the DCI in step 1022. The operation indication information may also be received through a MAC CE instead of DCI.

A multi-TRP" scenario will now be described.

The NR UE receiving data from a plurality of TRPs may determine whether to perform interference cancellation or rate matching for each TRP according to the type of TRP. For example, if each of the plurality of TRPs point to the base station of the LTE-NR coexistence cell, CRS rate matching may be required because the interference signal strength received from the TRP closest to the UE is very large compared to the NR signal strength. On the other hand, because the ratio of the NR signal strength to the CRS signal strength from the remaining TRP may be relatively small, the CRS interference cancellation operation may be appropriate. Or vice versa, it may be appropriate to perform CRS interference cancellation from the TRP closest to the distance, and to perform a CRS rate matching operation from the remaining TRPs. Therefore, the NR UE may remove the CRS from a specific TRP by performing an interference cancellation operation, and the CRS from another TRP may perform a rate matching operation.

At this time, the TRP performing the CRS interference cancellation and CRS rate matching operations may be predefined (that is, stored in advance in the UE) through the NR standard document, or may be delivered to the UE through control information (e.g. RRC settings) configured by the NR base station to the UE. The TRP defined above or configured through control information may be expressed as an Index value configured for each CORESET, for example, a CORESETPoolIndex value, a physical cell ID (PCID), and/or an SSB Index. The CRS rate matching operation may be applied to a CORESET configured with CORESETPoolIndex=0, and the CRS interference cancellation operation may be applied to a CORESET configured with CORESETPoolIndex=1.

Figure 11:
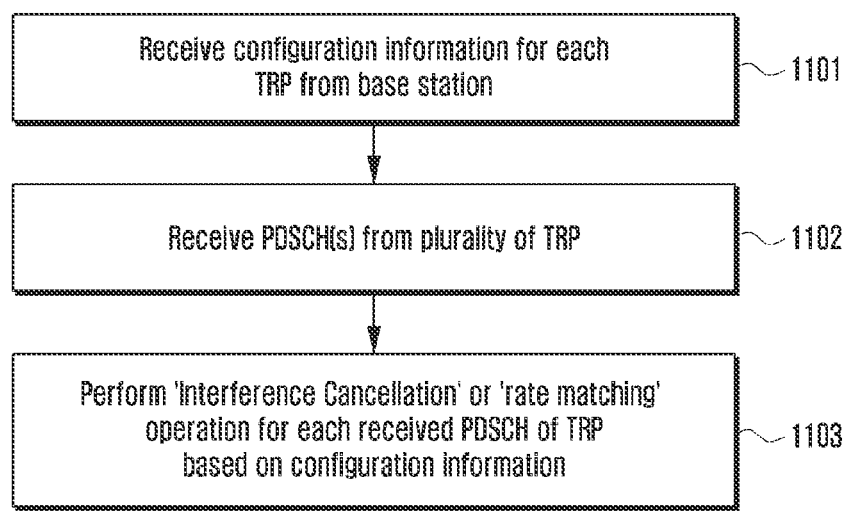
FIG. 11 is a diagram for illustrating an example of an operation of a UE in a wireless communication system, according to an embodiment.

FIG. 11 is a diagram for illustrating an operation of an NR UE, according to an embodiment.

Referring to FIG. 11, the NR UE receives configuration information for each TRP from the base station in step 1101. Then, the UE receives the PDSCH(s) from a plurality of TRPs in step 1102. In step 1103, the UE performs interference cancellation or a rate matching operation for each TRP for each PDSCH received based on the configuration information received from the base station.

IV. An operation in an MBSFN will now be described.

The NR UE may receive the mbsfn-SubframeConfigList from the NR base station through the RateMatchPatternLTE-CRS IE of Table 2, and may identify slot(s) corresponding to (overlapping) the MBSFN subframe in LTE among the slots of the serving cell (LTE-NR coexistence cell). In the identified slots, interference cancellation according to the above embodiments may not be performed. In the identified slot(s), rate matching operation may be performed. Alternatively, rate matching may be performed only on CRS RE(s) present in the MBSFN subframe.

The NR UE may receive the "mbsfn-SubframeConfigList" of neighboring LTE cell(s) from the NR base station, and may identify slot(s) corresponding to (overlapping) the MBSFN subframe in LTE among the slots of the serving cell (LTE-NR coexistence cell). In the identified slots, interference cancellation may not be performed. In the identified slot(s), a rate matching operation may be performed. Alternatively, rate matching may be performed only on CRS RE(s) present in the MBSFN subframe.

"Embodiment 4" may refer to an embodiment of NR PDSCH mapping only at a CRS RE(s) of some slots.

The mapping of a PDSCH of NR to a CRS RE(s) of LTE in the above embodiments may be applied to some slots of NR slots. The NR PDSCH may not be mapped to a CRS RE(s) of LTE included in the remaining slots except for some of the applied slots.

The NR base station may deliver, to the NR UE, information (e.g., at least one pattern among a plurality of defined slot pattern(s) and/or a list of slots) on the slot to which the mapping of the NR PDSCH to the LTE CRS RE(s). Based on the information, the UE may perform the interference cancellation operation according to the above embodiments in slots in which the NR PDSCH is mapped to the LTE CRS RE(s), and perform a rate matching operation in the remaining slots. In addition, in the remaining slots, the NR UE may receive LTE CRS(s) and use the LTE CRS(s) to estimate $h_{LTE-UE}$ information of Equation (2).

The LTE base station may deliver, to the NR UE, information (e.g., at least one pattern among a plurality of defined slot pattern(s) and/or a list of slots) on the slot to which the mapping of the NR PDSCH to the LTE CRS RE(s). Based on the information, the UE may discard the CRS RE(s) received in the slots to which the mapping of the NR PDSCH to the LTE CRS RE(s) is applied without utilizing for channel estimation.

"Embodiment 5" may refer to an embodiment which combines some or all of the previously mentioned embodiments.

Figure 12:
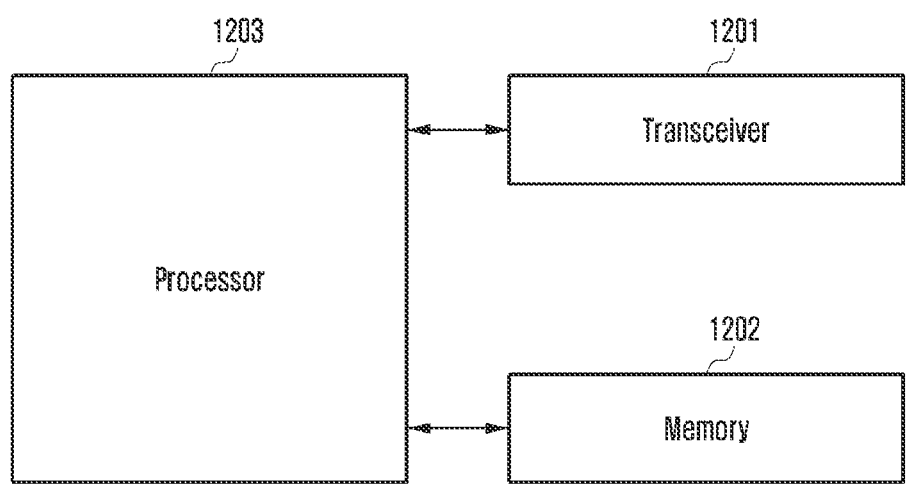
FIG. 12 is a block diagram of a UE, according to an embodiment.
Figure 13:
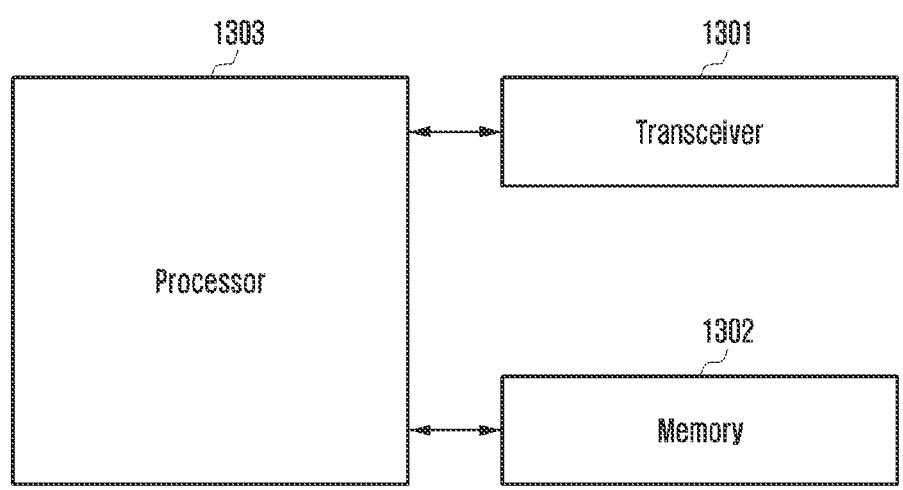
FIG. 13 is a block diagram of a base station, according to an embodiment.

In order to perform the above-described embodiments of the disclosure, a transceiver, a memory, and a processor of a UE and a base station are illustrated in FIGS. 12 and 13, respectively. In the above-described embodiments, a method for configuring CRS pattern information for neighboring LTE cell(s), a method for configuring an operation (interference cancellation or rate matching), a method for indicating an operation, and a method for exchanging UE capability information, are illustrated. To perform this, the transceiver, memory, and processor of the base station and the UE must operate according to the above-described embodiments, respectively.

FIG. 12 illustrates a structure of a UE, according to an embodiment.

Referring to FIG. 12, the UE includes a transceiver 1201, a memory 1202, and a processor 1203. However, the components of the UE are not limited to the above-described examples. For example, the UE may include more or fewer components than the aforementioned components. In addition, the transceiver 1201, the memory 1202, and the processor 1203 may be implemented in the form of a single chip.

The transceiver 1201 may transmit/receive a signal to/from the base station. The above-described signal may include control information and data. To this end, the transceiver 1201 may include a radio frequency (RF) transmitter for up-converting and amplifying a frequency of a transmitted signal, and an RF receiver for low-noise amplifying and down-converting a received signal. In addition, the transceiver 1201 may receive a signal through a wireless channel, output the signal to the processor 1203, and transmit the signal output from the processor 1203 through a wireless channel.

The memory 1202 may store programs and data necessary for the operation of the UE. In addition, the memory 1202 may store control information or data included in a signal transmitted and received by the UE. The memory 1202 may be configured as a storage medium or a combination of storage media, such as a read only memory (ROM), a random access memory (RAM), a hard disk, a compact disc (CD)-ROM, and a digital versatile disc (DVD). In addition, the memory 1202 may be composed of a plurality of memories, and may store a program for removing and decoding interference from some RE(s) in the PDSCH of the UE.

The processor 1203 may control a series of processes in which the UE may operate according to the above-described embodiments. For example, the processor 1203 may control decoding and removing interference from some RE(s) in the PDSCH.

Specifically, the processor 1203 may receive the CRS pattern configuration related information for the neighboring LTE cell(s) from the base station, and may control each configuration of a UE having an interference cancellation operation or a rate matching operation in some RE(s) in the PDSCH received from the base station based on the CSR pattern configuration related information for the neighboring LTE cell(s) from the base station.

Specifically, the processor 1203 may receive the CRS pattern configuration related information for the neighboring LTE cell(s) from the base station, and may control each configuration of a UE having an interference cancellation operation or a rate matching operation in some RE(s) in the PDSCH received from the base station based on the CSR pattern configuration related information for the neighboring LTE cell(s) and the operation indication information delivered through higher layer signaling or lower layer signaling (DCI or a MAC CE) from the base station.

In addition, the processor 1203 may include a plurality of processors, and by executing a program stored in the memory 1202, a method of removing and decoding interference from some RE(s) in the PDSCH may be performed.

FIG. 13 illustrates a structure of a base station, according to an embodiment.

Referring to FIG. 13, the base station includes a transceiver 1301, a memory 1302, and a processor 1303. However, the components of the UE are not limited to the above-described examples. For example, the base station may include more or fewer components than the aforementioned components. In addition, the transceiver 1301, the memory 1302, and the processor 1303 may be implemented in the form of a single chip.

The transceiver 1301 may transmit/receive a signal to/from the UE. The above-described signal may include control information and data. To this end, the transceiver 1301 may include an RF transmitter for up-converting and amplifying a frequency of a transmitted signal, and an RF receiver for low-noise amplifying and down-converting a received signal. In addition, the transceiver 1301 may receive a signal through a wireless channel, output the signal to the processor 1303, and transmit the signal output from the processor 1303 through a wireless channel.

The memory 1302 may store programs and data necessary for the operation of the base station. In addition, the memory 1302 may store control information or data included in a signal transmitted and received by the base station. The memory 1302 may be configured as a storage medium or a combination of storage media, such as a ROM, a RAM, a hard disk, a CD-ROM, and a DVD. In addition, the memory 1302 may be composed of a plurality of memories. The memory 1302 may store a program for generating CRS pattern configuration related information for the neighboring LTE cell(s) of the base station and transmitting information to the UE. Alternatively, the memory 1302 may store a program for generating CRS pattern configuration related information for the neighboring LTE cell(s) of the base station and transmitting information to the UE. Additionally, the memory 1302 may store a program for generating and transmitting a downlink control channel or a MAC CE containing information indicating an interference cancellation operation or a rate matching operation. The memory 1302 may additionally store a data mapping determination program to specific RE(s) in the PDSCH.

The processor 1303 may control a series of processes in which the base station may operate according to the above-described embodiments of the disclosure. For example, the processor 1303 may control each configuration of the base station for generation and transmission of CRS pattern configuration information for neighboring LTE cell(s), generation and transmission of information indicating an interference cancellation operation or a rate matching operation, and determination of data mapping to specific RE(s) in a PDSCH based on the configuration information and operation indication information.

In addition, the processor 1303 may include a plurality of processors, and by executing a program stored in the memory 1302, may perform a method of generating and transmitting CRS pattern configuration related information for neighboring LTE cell(s), a method of indicating an interference cancellation operation or a rate matching operation, and a method of symbol mapping to specific RE(s) in PDSCH based on the configuration information and operation indication information.

The methods described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable ROM (EEPROM), a magnetic disc storage device, a CD-ROM, DVDs, other types of optical storage devices, or a magnetic cassette. Alternatively, any combination of some or all of the non-volatile memories may form a memory in which the program is stored. Further, a plurality of such memories may be included in the electronic device.

In addition, the programs may be stored in an attachable storage device which may access the electronic device through communication networks such as the Internet, an intranet, a local area network (LAN), a wide LAN (WLAN), a storage area network (SAN), or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. Further, the embodiments of the disclosure may be applied to other communication systems, and other variants based on the technical idea of the embodiments may also be implemented. For example, the embodiments may be applied to LTE, 5G, and NR systems.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents,

What is claimed is:

1. A method performed by a terminal in a communication system, the method comprising:
    receiving, from a base station via radio resource control (RRC) signaling:
        cell-specific reference signal (CRS) pattern information for a serving cell, wherein the serving cell is a long-term evolution (LTE)-new radio (NR) coexistence cell. and
        at least one CRS pattern information for at least one neighboring cell, wherein the at least one neighboring cell is an LTE cell,
    receiving, from the base station, a medium access control (MAC) control element (CE) including a field indicating an interference cancellation or a rate matching for the at least one neighboring cell, wherein a size of the field is based on a number of the at least one CRS pattern information for the at least one neighboring cell, identifying resource elements (REs) for a CRS of the at least one neighboring cell based on the at least one CRS pattern information for the at least one neighboring cell;

determining whether to perform the interference cancellation or the rate matching to receive a physical downlink shared channel (PDSCH) on the REs for the CRS of the at least one neighboring cell based on the field; and receiving, from the base station, the PDSCH according to the determination, wherein, in case that the field indicates interference cancellation for a neighboring cell among the at least one neighboring cell. the interference cancellation is performed on REs for the CRS of the neighboring cell, wherein, in case that the field indicates rate matching for the neighboring cell among the at least one neighboring cell, rate matching is performed on REs for the CRS of the neighboring cell, and wherein the at least one CRS pattern information for the at least one neighboring cell includes:
information indicating whether an LTE radio frame boundary and an NR radio frame boundary of the serving cell are aligned, and
information indicating an offset between the LTE radio frame boundary and the NR radio frame boundary of the serving cell. in case that the LTE radio frame boundary and the NR radio frame boundary of the serving cell are not aligned.

2. The method of claim 1, wherein receiving the PDSCH based on the interference cancellation comprises:
generating a CRS sequence based on the configuration information;
estimating a channel with the cell based on the CRS sequence and a received signal; and
receiving, from the base station, the PDSCH on the REs for the CRS by canceling the CRS from the received signal based on the CRS sequence and the channel with the cell.

3. The method of claim 1, wherein whether to perform interference cancellation or rate matching to receive the PDSCH on the REs for the CRS is determined based on at least one of:
capability information transmitted to the base station; or
a configuration received from the base station in accordance with the capability information.

4. The method of claim 1, wherein whether to perform interference cancellation or rate matching to receive the PDSCH on the REs for the CRS is determined based on at least one of:
a transmission and reception point (TRP) transmitting the PDSCH;
a multimedia broadcast single frequency network (MBSFN) subframe configuration; or
a configuration defining whether the PDSCH is transmitted on the REs for the CRS in a slot.

5. A terminal in a communication system, the terminal comprising:
a transceiver; and
a controller configured to:
receive, from a base station via radio resource control (RRC) signaling:

cell-specific reference signal (CRS) pattern information for a serving cell, wherein the serving cell is a long-term evolution (LTE)-new radio (NR) coexistence cell, and
at least one CRS pattern information for at least one neighboring cell, wherein the at least one neighboring cell is an LTE cell, receive, from the base station. a medium access control (MAC) control element (CE) including a field indicating an interference cancellation or a rate matching for the at least one neighboring cell, wherein a size of the field is based on a number of the at least one CRS pattern information for the at least one neighboring cell, identify resource elements (REs) for a CRS of the at least one neighboring cell based on the at least one CRS pattern information for the at least one neighboring cell;

determine whether to perform the interference cancellation or the rate matching to receive a physical downlink shared channel (PDSCH) on the REs for the CRS of the at least one neighboring cell based on the field; and receive, from the base station, the PDSCH according to the determination, wherein, in case that the field indicates interference cancellation for a neighboring cell among the at least one neighboring cell, the interference cancellation is performed on REs for the CRS of the neighboring cell, wherein, in case that the field indicates rate matching for the neighboring cell among the at least one neighboring cell, rate matching is performed on REs for the CRS of the neighboring cell, and wherein the at least one CRS pattern information for the at least one neighboring cell includes:
information indicating whether an LTE radio frame boundary and an NR radio frame boundary of the serving cell are aligned, and
information indicating an offset between the LTE radio frame boundary and the NR radio frame boundary of the serving cell, in case that the LTE radio frame boundary and the NR radio frame boundary of the serving cell are not aligned.

6. The terminal of claim 5, wherein receiving the PDSCH based on the interference cancellation comprises:
generating a CRS sequence based on the configuration information;
estimating a channel with the cell based on the CRS sequence and a received signal; and
receiving, from the base station, the PDSCH on the REs for the CRS by canceling the CRS from the received signal based on the CRS sequence and channel with the cell.

7. The terminal of claim 5, wherein whether to perform interference cancellation or rate matching to receive the PDSCH on the REs for the CRS is determined based on at least one of:
capability information transmitted to the base station; or
a configuration received from the base station in accordance with the capability information.

8. The terminal of claim 5, wherein whether to perform interference cancellation or rate matching to receive the PDSCH on the REs for the CRS is determined based on at least one of:
a transmission and reception point (TRP) transmitting the PDSCH;
a multimedia broadcast single frequency network (MBSFN) subframe configuration; or a configuration defining whether the PDSCH is transmitted on the REs for the CRS in a slot.

9. A method performed by a base station in a communication system, the method comprising:
- transmitting, to a terminal via radio resource control (RRC) signaling:
  - cell-specific reference signal (CRS) pattern information for a serving cell, wherein the serving cell is a long-term evolution (LTE)-new radio (NR) coexistence cell, and
  - at least one CRS pattern information for at least one neighboring cell, wherein the at least one neighboring cell is an LTE cell,
- transmitting, to the terminal, a medium access control (MAC) control element (CE) including a field indicating an interference cancellation or a rate matching for the at least one neighboring cell, wherein a size of the field is based on a number of the at least one CRS pattern information for the at least one neighboring cell,
- identifying resource elements (REs) for a CRS of the at least one neighboring cell based on the at least one CRS pattern information for the at least one neighboring cell; and
- transmitting, to the terminal, a physical downlink shared channel (PDSCH),
- wherein the PDSCH on the REs for the CRS is associated with the interference cancellation or the rate matching based on the field,
- wherein, in case that the field indicates interference cancellation for a neighboring cell among the at least one neighboring cell, the interference cancellation is performed on REs for the CRS of the neighboring cell,
- wherein, in case that the field indicates rate matching for the neighboring cell among the at least one neighboring cell. rate matching is performed on REs for the CRS of the neighboring cell, and
- wherein the at least one CRS pattern information for the at least one neighboring cell includes:
  - information indicating whether an LTE radio frame boundary and an NR radio frame boundary of the serving cell are aligned, and
  - information indicating an offset between the LTE radio frame boundary and the NR radio frame boundary of the serving cell, in case that the LTE radio frame boundary and the NR radio frame boundary of the serving cell are not aligned.

10. The method of claim 9, wherein whether the PDSCH on the REs for the CRS is associated with the interference cancellation or the rate matching is determined based on at least one of:
- capability information transmitted to the base station; or
- a configuration received from the base station in accordance with the capability information.

11. The method of claim 9, wherein whether the PDSCH on the REs for the CRS is associated with the interference cancellation or the rate matching is determined based on at least one of:
- a transmission and reception point (TRP) transmitting the PDSCH;
- a multimedia broadcast single frequency network (MBSFN) subframe configuration; or
- a configuration defining whether the PDSCH is transmitted on the REs for the CRS in a slot.

12. A base station in a communication system, the base station comprising:
- a transceiver; and
- a controller configured to:
  - transmit, to a terminal via radio resource control (RRC) signaling:
    - cell-specific reference signal (CRS) pattern information for a serving cell, wherein the serving cell is a long-term evolution (LTE)-new radio (NR) coexistence cell, and
    - at least one CRS pattern information for at least one neighboring cell, wherein the at least one neighboring cell is an LTE cell,
  - transmit, to the terminal, a medium access control (MAC) control element (CE) including a field indicating an interference cancellation or a rate matching for the at least one neighboring cell, wherein a size of the field is based on a number of the at least one CRS pattern information for the at least one neighboring cell,
  - identify resource elements (REs) for a CRS of the at least one neighboring cell based on the at least one CRS pattern information for the at least one neighboring cell; and
  - transmit, to the terminal, a physical downlink shared channel (PDSCH),
- wherein the PDSCH on the REs for the CRS is associated with the interference cancellation or the rate matching based on the field,
- wherein, in case that the field indicates interference cancellation for a neighboring cell among the at least one neighboring cell, the interference cancellation is performed on REs for the CRS of the neighboring cell,
- wherein, in case that the field indicates rate matching for the neighboring cell among the at least one neighboring cell, rate matching is performed on REs for the CRS of the neighboring cell, and
- wherein the at least one CRS pattern information for the at least one neighboring cell includes:
  - information indicating whether an LTE radio frame boundary and an NR radio frame boundary of the serving cell are aligned, and
  - information indicating an offset between the LTE radio frame boundary and the NR radio frame boundary of the serving cell, in case that the LTE radio frame boundary and the NR radio frame boundary of the serving cell are not aligned.

13. The base station of claim 12, wherein whether the PDSCH on the REs for the CRS is associated with the interference cancellation or the rate matching is determined based on at least one of:
- capability information transmitted to the base station; or
- a configuration received from the base station in accordance with the capability information.

14. The base station of claim 12, wherein whether the PDSCH on the REs for the CRS is associated with the interference cancellation or the rate matching is determined based on at least one of:
- a transmission and reception point (TRP) transmitting the PDSCH;
- a multimedia broadcast single frequency network (MBSFN) subframe configuration; or
- a configuration defining whether the PDSCH is transmitted on the REs for the CRS in a slot.

* * * * *